(12) United States Patent
Hashimoto

(10) Patent No.: US 12,056,135 B2
(45) Date of Patent: Aug. 6, 2024

(54) RANKING DETERMINATION SYSTEM, RANKING DETERMINATION METHOD, AND INFORMATION STORAGE MEDIUM

(71) Applicant: RAKUTEN GROUP, INC., Tokyo (JP)

(72) Inventor: Chikara Hashimoto, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 18/126,998

(22) Filed: Mar. 27, 2023

(65) Prior Publication Data
US 2023/0315744 A1   Oct. 5, 2023

(30) Foreign Application Priority Data
Mar. 30, 2022 (JP) .................. 2022-056458

(51) Int. Cl.
*G06F 16/2457* (2019.01)
*G06F 16/28* (2019.01)
*G06F 16/906* (2019.01)

(52) U.S. Cl.
CPC ...... *G06F 16/24578* (2019.01); *G06F 16/285* (2019.01)

(58) Field of Classification Search
CPC . G06F 16/24578; G06F 16/906; G06F 16/285
See application file for complete search history.

(56) References Cited

U.S. PATENT DOCUMENTS

| | | | |
|---|---|---|---|
| 10,417,059 B1 * | 9/2019 | Arya | G06F 16/211 |
| 2010/0185611 A1 | 7/2010 | Liao et al. | |
| 2014/0289210 A1 | 9/2014 | Taank et al. | |
| 2017/0255906 A1 * | 9/2017 | Le | G06F 16/9535 |

* cited by examiner

*Primary Examiner* — Etienne P Leroux
(74) *Attorney, Agent, or Firm* — HEA LAW PLLC

(57) ABSTRACT

Provided is a ranking determination system including at least one processor configured to: acquire a plurality of second classifications relating to second data based on a first model which has learned a relationship between first data and a first classification relating to the first data; acquire, for each of the second classifications, a second score relating to a validity of a combination of the second data and the second classification based on a second model which has learned a validity of a combination of third data and a third classification relating to the third data; and determine a second ranking for each of the plurality of second classifications based on the second score of each second classification.

18 Claims, 16 Drawing Sheets

FIG.6

| INDEX | URL |
|---|---|
| TITLE T1, FIRST ATTRIBUTE A11, FIRST ATTRIBUTE VALUE V11, KEYWORD K1··· | URL U1 |
| TITLE T2, FIRST ATTRIBUTE A12, FIRST ATTRIBUTE VALUE V12, KEYWORD K2··· | URL U2 |
| TITLE T3, FIRST ATTRIBUTE A13, FIRST ATTRIBUTE VALUE V13, KEYWORD K3··· | URL U3 |
| ⋮ | ⋮ |

| INPUT PORTION | OUTPUT PORTION DB2 | |
|---|---|---|
| | FIRST ATTRIBUTE | FIRST ATTRIBUTE VALUE |
| TITLE T1 | FIRST ATTRIBUTE A11 | FIRST ATTRIBUTE VALUE V11 |
| TITLE T2 | FIRST ATTRIBUTE A12 | FIRST ATTRIBUTE VALUE V12 |
| TITLE T3 | FIRST ATTRIBUTE A13 | FIRST ATTRIBUTE VALUE V13 |
| ⋮ | ⋮ | ⋮ |

FIG.8

| DB3 |
|---|
| PAST QUERY |
| PAST QUERY Q1 |
| PAST QUERY Q2 |
| PAST QUERY Q3 |
| ⋮ |

FIG.9

| PAST QUERY | PAGE INFORMATION | | |
|---|---|---|---|
| | TITLE | THIRD ATTRIBUTE | THIRD ATTRIBUTE VALUE |
| PAST QUERY Q1 | TITLE T4 | THIRD ATTRIBUTE A310<br>THIRD ATTRIBUTE A311 | THIRD ATTRIBUTE VALUE V310<br>THIRD ATTRIBUTE VALUE V311 |
| PAST QUERY Q2 | TITLE T5 | THIRD ATTRIBUTE A320<br>THIRD ATTRIBUTE A321 | THIRD ATTRIBUTE VALUE V320<br>THIRD ATTRIBUTE VALUE V321 |
| PAST QUERY Q3 | TITLE T6 | THIRD ATTRIBUTE A330<br>THIRD ATTRIBUTE A331 | THIRD ATTRIBUTE VALUE V330<br>THIRD ATTRIBUTE VALUE V331 |
| ⋮ | ⋮ | ⋮ | ⋮ |

DB4

RANKING DETERMINATION SYSTEM, RANKING DETERMINATION METHOD, AND INFORMATION STORAGE MEDIUM

CROSS-REFERENCE TO RELATED APPLICATION

The present application claims priority from the Japanese patent application JP 2022-056458 filed on Mar. 30, 2022, the disclosures of which are incorporated by reference herein.

BACKGROUND OF THE INVENTION

1. Field of the Invention

The present disclosure relates to a ranking determination system, a ranking determination method, and an information storage medium.

2. Description of the Related Art

Hitherto, technologies for classifying data based on models using machine learning have been known. A multi-label model can estimate a plurality of classifications. Models may not output the optimal estimation result, and hence it is important to evaluate whether the estimation result of the model is valid. One way to evaluate the estimation result of the model is to use a ranking relating to a plurality of classifications.

Taking as an example a case in which a query input by a user is classified and used in a search, the model which estimates the classification of the query calculates a score relating to the validity of the estimation result. A high ranking corresponding to this score means that the estimation result of the model is relatively valid, and hence, when the search is executed by using only classifications having a high ranking, estimation results which are not particularly valid can be prevented from being used in the search. Thus, in technologies for classifying data, it is important to accurately determine the ranking relating to the validity of the estimation result.

For example, in US 2010/0185611 A and US 2014/0289210 A, there is described a technology for executing a search based on a query input by a user and a search engine for an Internet service, and re-ranking the search results so that the search results output from the search engine are ranked optimally.

SUMMARY OF THE INVENTION

However, the technology as described in US 2010/0185611 A and US 2014/0289210 A merely re-ranks the search results output from the search engine, and hence does not determine a ranking relating to a plurality of classifications estimated by the model. For this reason, with the related-art technology, it has not been possible to accurately determine a ranking for a plurality of classifications estimated by the model.

One object of the present disclosure is to accurately determine a ranking relating to a plurality of classifications estimated by a model.

According to at least one embodiment of the present disclosure, there is provided a ranking determination system including at least one processor configured to: acquire a plurality of second classifications relating to second data based on a first model which has learned a relationship between first data and a first classification relating to the first data; acquire, for each of the plurality of second classifications, a second score relating to a validity of a combination of the second data and the each of the plurality of second classifications based on a second model which has learned a validity of a combination of third data and a third classification relating to the third data; and determine a second ranking for each of the plurality of second classifications based on the second score of the each of the plurality of second classifications.

BRIEF DESCRIPTION OF THE DRAWINGS

FIG. 6 is a table for showing an example of a page database.

FIG. 7 is a table for showing an example of a training database.

FIG. 8 is a table for showing an example of a query database.

FIG. 9 is a table for showing an example of a selection log database.

DETAILED DESCRIPTION OF THE INVENTION

1. First Embodiment

Description is now given of a first embodiment of the present disclosure, which is an example of an embodiment of a ranking determination system according to the present disclosure. In the first embodiment, a case of applying a ranking determination system to a search service is taken as an example. The ranking determination system is applicable to various situations. Application examples to other situations are described later in a second embodiment and modification examples of the present disclosure.

[1-1. Overall Configuration of Ranking Determination System]

Figure 1:
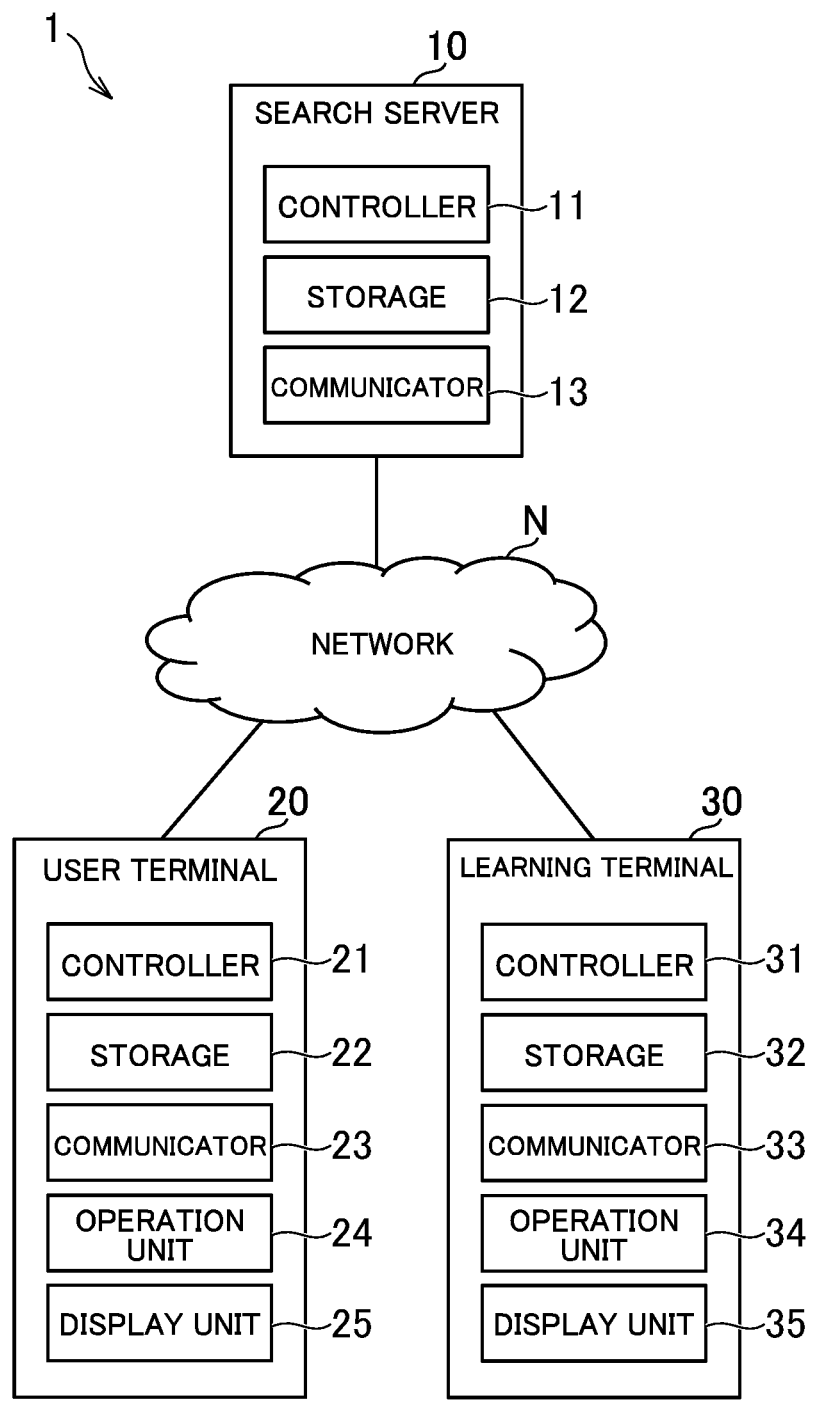
FIG. 1 is a diagram for illustrating an example of an overall configuration of a ranking determination system.

FIG. 1 is a diagram for illustrating an example of an overall configuration of a ranking determination system. For example, a ranking determination system 1 includes a search server 10, a user terminal 20, and a learning terminal 30. A network N is any network, such as the Internet or a local area network (LAN). It is only required that the ranking determination system 1 include at least one computer, and is not limited to the example of FIG. 1. For example, the ranking determination system 1 may include only the search server 10.

The search server 10 is a server computer. A controller 11 includes at least one processor. A storage 12 includes a volatile memory such as a random-access memory (RAM), and a nonvolatile memory such as a flash memory. A communicator 13 includes at least one of a communication interface for wired communication or a communication interface for wireless communication.

The user terminal 20 is a computer of a user who uses the search service. For example, the user terminal 20 is a personal computer, a smartphone, a tablet terminal, or a wearable terminal. The physical configuration of each of a controller 21, a storage 22, and a communicator 23 is the same as that of the controller 11, the storage 12, and the communicator 13, respectively. An operation unit 24 is an input device such as a touch panel or a mouse. A display unit 25 is a liquid crystal display or an organic EL display.

The learning terminal 30 is a computer which executes learning processing, which is described later. For example, the learning terminal 30 is a personal computer, a server computer, or a tablet terminal. The physical configuration of each of a controller 31, a storage 32, a communicator 33, an operation unit 34, and a display unit 35 are the same as that of the controller 11, the storage 12, the communicator 13, the operation unit 24, and the display unit 25, respectively.

The programs stored in the storages 12, 22, and 32 may be supplied via the network N. Further, each computer may include at least one of a reading unit (for example, a memory card slot) for reading a computer-readable information storage medium or an input/output unit (for example, a USB port) for inputting/outputting data to and from external devices. For example, a program stored in an information storage medium may be supplied via at least one of the reading unit or the input/output unit.

[1-2. Outline of Ranking Determination System]

Figure 2:
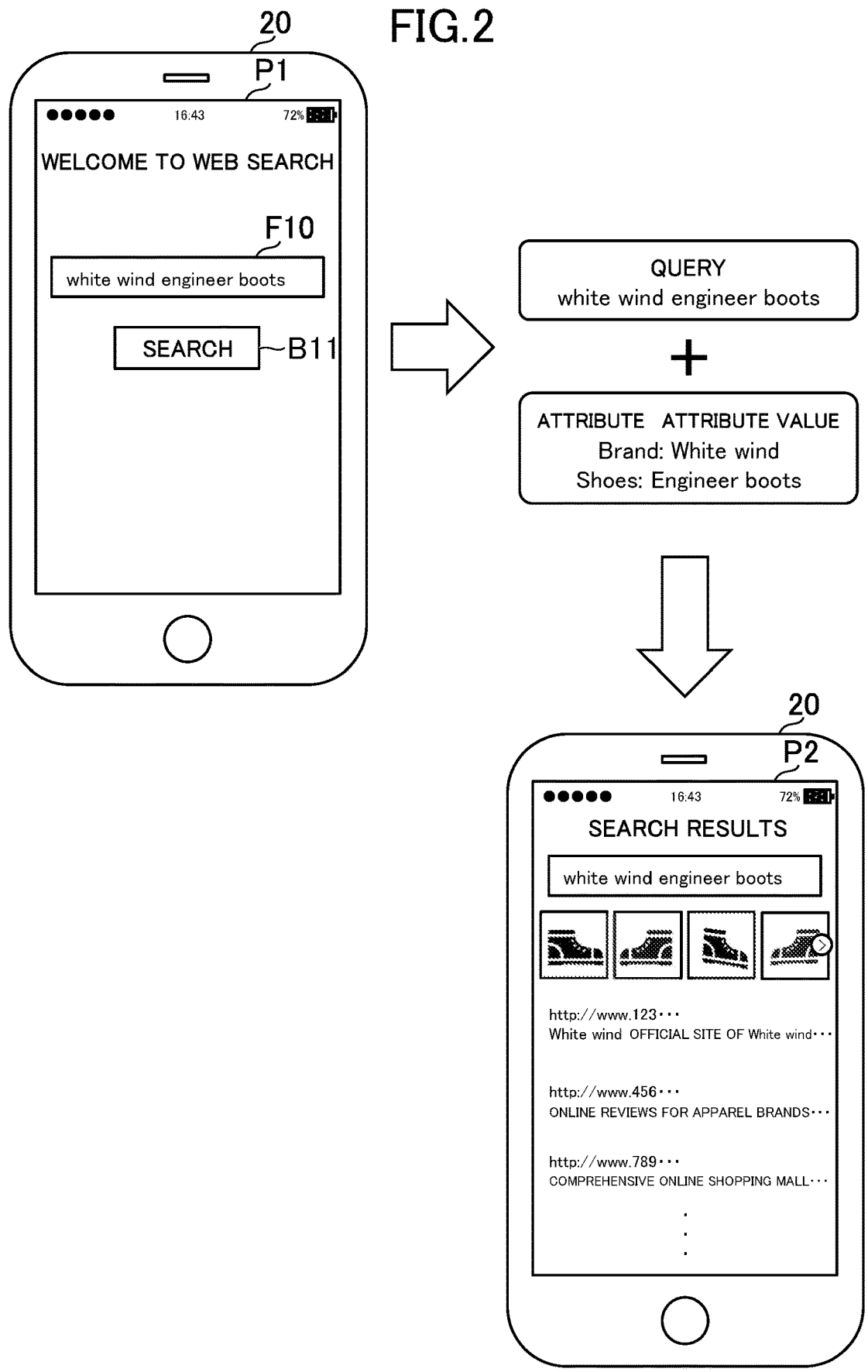
FIG. 2 is a diagram for illustrating an example of how a search service is used by a user.

FIG. 2 is a diagram for illustrating an example of how the search service is used by the user. For example, when the user accesses the search server 10, a top page P1 of the search service is displayed on the display unit 25. The user inputs a query into an input form F10 of the top page P1. When the user selects a button B11, the search server 10 executes web page search processing based on the query input by the user. When the user terminal 20 receives the execution result of the search processing from the search server 10, a search results page P2 is displayed on the display unit 25.

In the example of FIG. 2, a query such as "white wind engineer boots" is input. "White wind" is the name of a fictitious apparel brand. "Engineer boots" is a type of shoes. It is thought that the user has input the query of FIG. 2 with the intention of searching for the web page of "Engineer boots" sold by "White wind."

However, the words included in the query have various meanings. As a result, even when the search server 10 executes the search processing by using only the query, there is a possibility that the displayed search results page P2 does not match the intention of the user. For example, the word "white" in the query is also the name of a color. Given that there is a fictitious apparel brand "Engineer," the word "engineer" in the query may also be the name of another apparel brand. Due to those meanings, there is a possibility that a web page not intended by the user is retrieved.

Thus, in the first embodiment, an intention of the user estimated from the query is used in the search processing. For example, the intention of the user is estimated based on a model which uses machine learning. The model for estimating the intention of the user is hereinafter referred to as "first model." The first model can utilize various machine learning methods. The first model may be any of supervised learning, semi-supervised learning, and unsupervised learning. For example, the first model may be a model which uses a neural network or a model referred to as "Transformer." It is only required that the first model be a machine learning model used in the field of natural language processing. Further, for example, the first model may be a sparse linear one-versus-reset (OVR) model such as DiSMEC, ProXML, or PPD-Sparse, a partitioning model such as extreme-Text, Bonsai, NAPKINXC, or Parabel, an embedding model (graph-based model) such as SLICE or AnnexML, or a Transformer-based model such as XR-Transformer or Light-XML.

Figure 3:
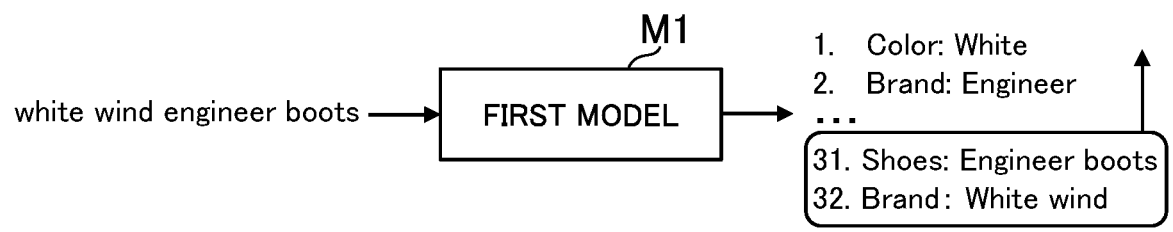
FIG. 3 is a diagram for illustrating an example of a first model.

FIG. 3 is a diagram for illustrating an example of the first model. For example, when a query is input to a first model M1, the first model M1 outputs, as the intention of the user, attributes and attribute values of web pages that the user conceivably desires to search for. The attributes and the attribute values, which are described in detail later, are information capable of classifying web pages from a predetermined point of view. Each of the numerical values of 1 to 32 of FIG. 3 is a ranking of the attributes and the attribute values. The ranking is determined in descending order of a first score calculated by the first model M1. The first score, which is described in detail later, is information relating to the validity (correctness) of an estimation result of the first model M1.

The ranking obtained from the first model M1 is hereinafter referred to as "first ranking." For example, in a case in which it is assumed that only the top five attributes and attribute values of the first ranking are used in the search processing, when the query includes only words that have been sufficiently learned by the first model M1, the accuracy of the estimation result of the first model M1 increases. In this case, the attributes and the attribute values that accurately represent the intention of the user are ranked higher, and hence the accuracy of the search processing increases.

Meanwhile, when the query includes words that have not been learned much by the first model M1, the accuracy of the estimation result of the first model M1 may be low. For example, when "White wind," which is the name of a fictitious apparel brand, has not been sufficiently learned by the first model M1, as illustrated in FIG. 3, the first model M1 may recognize the word "white" in the query as the name of a color, and may recognize the word "engineer" in the query as the name of another apparel brand.

In the example of FIG. 3, the attribute "Brand" and the attribute value "White wind" appropriately represent the intention of the user, but for the reason described above, the first ranking may be low. Similarly, the attribute "Shoes" and the attribute value "Engineer boots" appropriately represent the intention of the user, but unless those words have been sufficiently learned by the first model M1, the first ranking may be low. It is preferred that a combination of the attributes and the attribute values appropriately representing the intention of the user be ranked high.

Thus, in the first embodiment, re-ranking of the first ranking is executed by a second model which estimates the validity of combinations of a query and the attribute and attribute value estimated by the first model M1. The ranking obtained from the estimation result of the second model is hereinafter referred to as "second ranking." In the first embodiment, the second ranking is the ranking after re-ranking is executed.

The second model can use various machine learning methods. The second model may be any of supervised learning, semi-supervised learning, and unsupervised learning. For example, the second model may be a model which uses a neural network or a model referred to as "Transformer." It is only required that the second model be a machine learning model used in the field of natural language processing. The second model may be a distance learning model (metric learning model) which learns the distance between queries (for example, the distance between text-based vector representations), or may be a ranking learning model (LTR: Learning To Rank model) which learns a query such as text by scoring another query based on a predetermined criterion. The second model may use, as the ranking learning model, a model based on a pointwise approach, a model based on a pairwise approach, a model based on a listwise approach, or a model based on a combination of various approaches.

Figure 4:
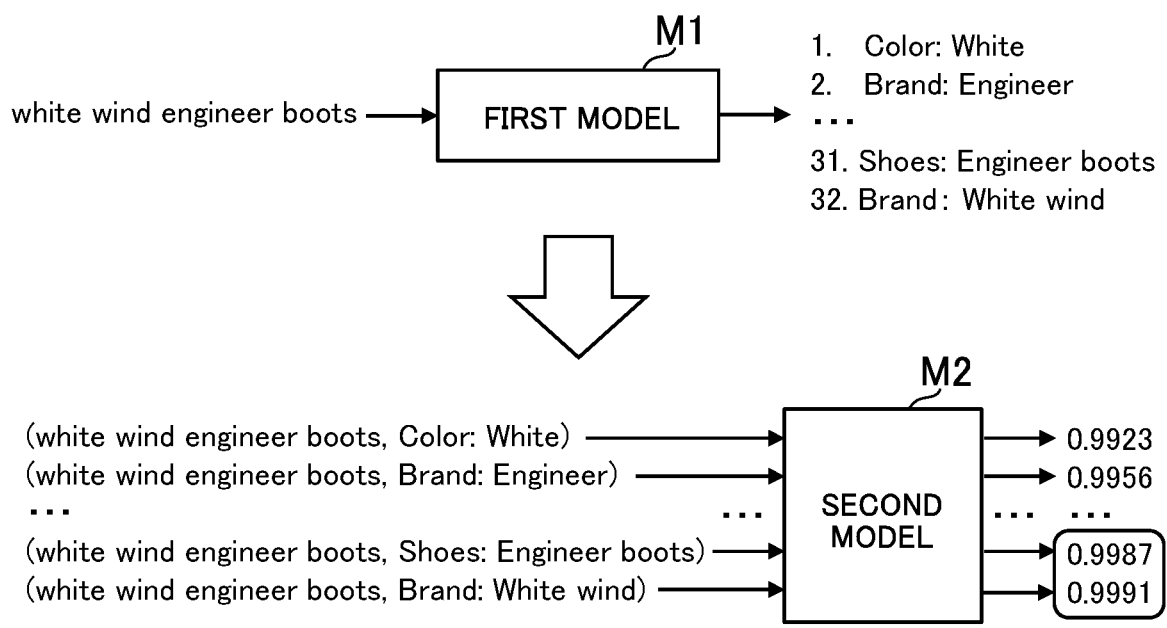
FIG. 4 is a diagram for illustrating an example of a second model.

FIG. 4 is a diagram for illustrating an example of the second model. For example, when combinations of a query and the attribute and attribute value estimated by the first model M1 are input to a second model M2, the second model M2 outputs a second score for those combinations. The second score, which is described in detail later, is information relating to the validity of each of those combinations. A second ranking is determined in descending order of the second score.

In the first embodiment, the second model M2 has learned training data created from a point of view different from that of the first model M1. Thus, as illustrated in FIG. 4, the attribute "Brand" and the attribute value "White wind," which are ranked low in the first ranking, may be ranked high in the second ranking. Similarly, the attribute "Shoes" and the attribute value "Engineer Boots," which are ranked low in the first ranking, may be ranked high in the second ranking.

In this way, through using the second model M2 to execute re-ranking of the first ranking, the ranking determination system 1 can increase the rank of the attributes and the attribute values which accurately represent the intention of the user. Now, the details of the ranking determination system 1 are described.

[1-3. Functions to be Implemented in Ranking Determination System]

Figure 5:
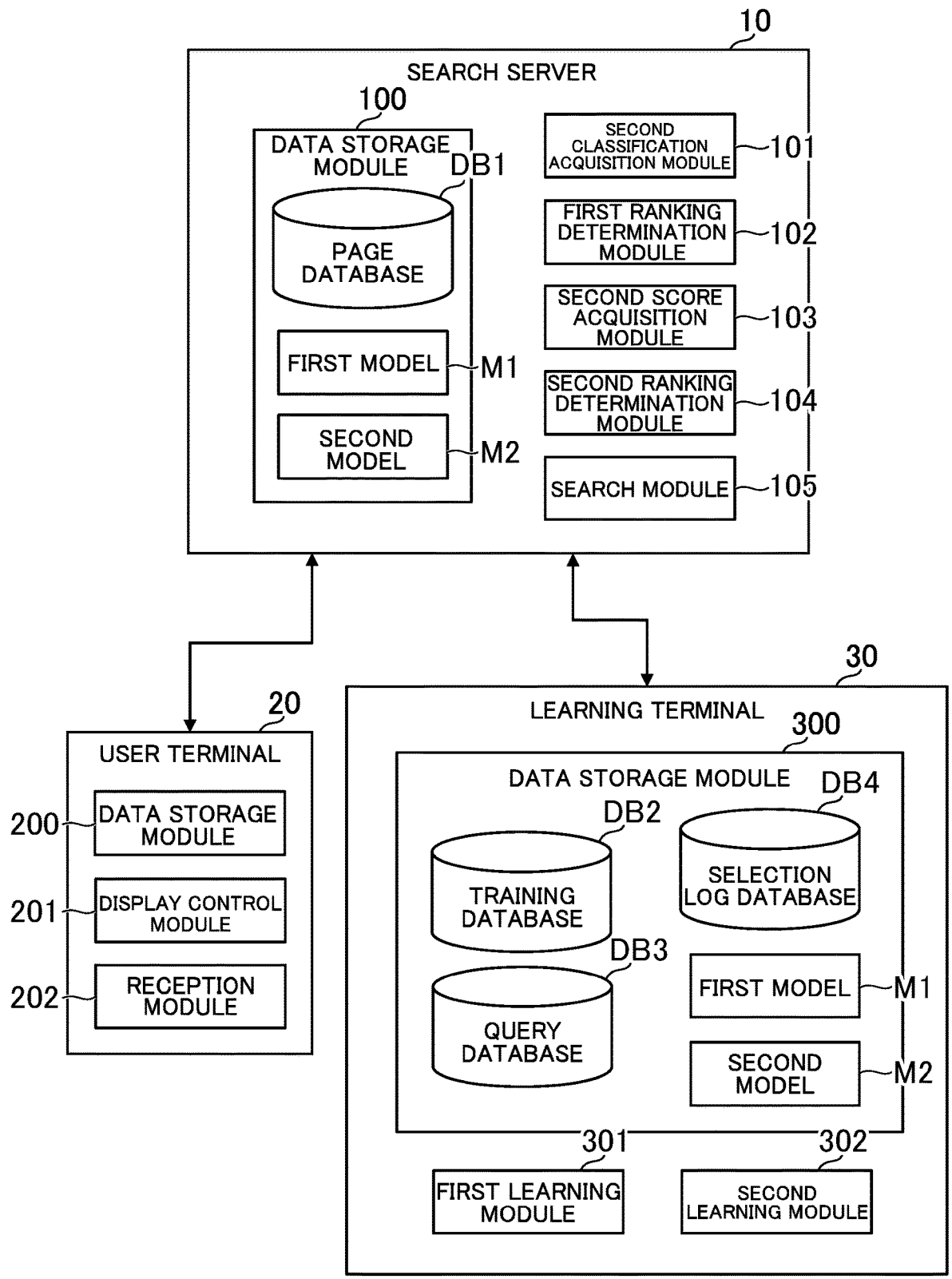
FIG. 5 is a functional block diagram for illustrating an example of functions to be implemented in the ranking determination system.

FIG. 5 is a functional block diagram for illustrating an example of functions to be implemented in the ranking determination system 1.

[1-3-1. Functions to be Implemented by Search Server]

A data storage module 100 is implemented by the storage 12. A second classification acquisition module 101, a first ranking determination module 102, a second score acquisition module 103, a second ranking determination module 104, and a search module 105 are implemented by the controller 11.

[Data Storage Module]

The data storage module 100 stores the data required in order to provide a search service to the user. For example, the data storage module 100 stores a page database DB1.

FIG. 6 is a table for showing an example of the page database DB1. The page database DB1 is a database relating to web pages that are searchable by a search service. For example, the page database DB1 stores web page indexes and web page URLs in association with each other. The data stored in the page database DB1 may be any data, and is not limited to the example of FIG. 6. For example, actual data (for example, HTML data) of a web page may be stored.

An index is information to be compared with a query. Any information can be used as the index. For example, the title of the web page, the attribute and attribute value of the web page, any keyword included in the web page, or a combination of those is used as the index. The attribute and attribute value stored as an index in the page database DB1 are hereinafter referred to as "first attribute" and "first attribute value," respectively. The first attribute is information which can classify the web page. The first attribute can also be referred to as the type, category, or genre of the web page. The first attribute is represented by letters, numbers, other symbols, or a combination of those. The first attribute may be any attribute capable of classifying the web page from a predetermined point of view, and the first attribute can be set from any point of view. For example, a web page of an apparel brand is associated with the first attribute "Brand." For example, a web page for shoes is associated with the first attribute "shoes."

The first attribute value is a specific value of the first attribute. At least one first attribute value is associated with the first attribute. At least one of a plurality of first attribute values associated with a given first attribute is associated with the web page. The first attribute value is represented by letters, numbers, other symbols, or a combination of those. It is only required that the first attribute value define the details of the attribute from a predetermined point of view, and the first attribute value can be set from any point of view.

For example, the first attribute "Brand" is associated with the names of various apparel brands as first attribute values. The first attribute "Brand" and a first attribute value "White wind" are associated with the web page of the company "White wind." Assuming that the "White wind" company sells a plurality of types of shoes, of the plurality of first attribute values associated with the first attribute "Shoes," a first attribute value indicating the type of the shoes is associated with a web page of the "White wind" company.

For example, in a case in which a first attribute value "Engineer boots" indicating engineer boots, a first attribute value "Business Shoes" indicating business shoes, and a first attribute value "Sneaker" indicating sneakers are associated with the first attribute "Shoes," in this case, the first attribute "shoes" and the first attribute value "Engineer boots" are associated with the web page for engineer boots, the first attribute "shoes" and the first attribute value "Business Shoes" are associated with the web page for business shoes, and the first attribute "shoes" and the first attribute value "Sneaker" are associated with the web page for sneakers.

In the first embodiment, it is assumed that a creator of the web page specifies the first attribute and the first attribute value. For example, the creator, who is an employee of the "White wind" company, specifies the first attributes and the first attribute values to be associated with web pages of the "White wind" company. The first attribute and the first attribute value may be automatically extracted from the title of the web page, for example, or may be specified by an administrator of the search service.

The data storage module 100 stores the trained first model M1. The first model M1 includes a program portion for executing processing such as feature amount calculation, and a parameter portion such as a weighting. The trained first model M1 is a first model M1 on which learning processing has been executed by a first learning module 301 described later.

The data storage module 100 stores the trained second model M2. The second model M2 includes a program portion for executing processing such as feature amount calculation, and a parameter portion such as a weighting. The trained second model M2 is a second model M2 on which learning processing has been executed by a second learning module 302 described later.

The data stored in the data storage module 100 is not limited to the example described above. The data storage module 100 can store any data. For example, the data storage module 100 may store data for displaying the top page P1 and the search results page P2. For example, the data storage module 100 may store a query database DB3 or a selection log database DB4, which are described later.

[Second Classification Acquisition Module]

The second classification acquisition module 101 acquires a plurality of second classifications relating to second data based on a first model M1 which has learned a relationship between first data and a first classification of the web page. The learning processing for causing the first model M1 to learn this relationship is described later in relation to the first learning module 301.

In the first embodiment, the web page corresponds to the first data. Thus, in the description of the first embodiment, "web page" can be read as "first data." The first data is the input portion of the training data of the first model M1. In the first embodiment, there is described a case in which, of the data relating to the web page, the title of the web page corresponds to the first data, but the first data may be any data that can be used in the learning of the first model M1, and the first data is not limited to the title of the web page. For example, the first data may be a keyword acquired from the web page, a character string other than the title included in the web page, or a summary created from the web page.

In the first embodiment, there is described a case in which the first data is an index that is usable in the search processing, but the first data may be data that is not particularly used as an index. For example, the first data may be, of the character strings included in the web page, a character string that does not serve as an index. In place of being a character string itself, the first data may be a feature amount indicating some kind of feature of a character string. The first data may have any format and is not limited to being a character string. For example, the first data may be image data, moving image data, document data, audio data, or any other data, or may be a feature amount, a vector representation, or an embedded representation which is based on at least a part of one or more pieces of data selected from a data group including image data, moving image data, document data, audio data, or any other data.

In the first embodiment, a combination of the first attribute and the first attribute value associated with the web page corresponds to a first classification. Thus, in the description of the first embodiment, "combination of the first attribute and the first attribute value" can be read as "first classification." The first classification is information capable of classifying the first data. The first classification is the output portion of the training data of the first model M1.

In the first embodiment, there is described a case in which the first classification is an index that is usable in the search processing, but the first classification may be any information that can be used in the learning of the first model M1, and can be data that is not in particular used as an index. For example, the first classification may be only any one of the first attribute or the first attribute value. The first classification may have any format and is not limited to being a character string. For example, the first classification may be information such as an ID or a number that can uniquely identify the classification. A combination of a plurality of first attributes and first attribute values may be treated as one first classification.

In the first embodiment, the query input by the user corresponds to the second data. Thus, in the description of the first embodiment, "query input by the user" can be read as "second data." The second data is data input to the first model M1. The second data is the data to be estimated by the first model M1. The second data has the same format as that of the first data.

The second data may be any data that is to be estimated by the first model M1, and is not limited to being a query. For example, in place of estimating the intention of the user, in a case of estimating the intention of the person who has created the web page, the second data may be the title of the web page, a character string other than the title included in the web page, a keyword used as an index of the web page, or a summary created from the web page. In place of being a character string itself, the second data may be a feature amount indicating some kind of feature of a character string. The second data may have any format and is not limited to being a character string. For example, the second data may be image data, moving image data, document data, audio data, or any other data, or may be a feature amount, a vector representation, or an embedded representation which is based on at least a part of one or more pieces of data selected from a data group including image data, moving image data, document data, audio data, or any other data.

The attribute and attribute value estimated for the query are an example of the second classification. This attribute and this attribute value are hereinafter referred to as "second attribute" and "second attribute value," respectively. Thus, in the description of the first embodiment, "the second attribute and second attribute value estimated for the query" can be read as "second classification." The second classification is information that is capable of classifying the second data. In the first embodiment, the second data is a query, and thus the second classification is the intention of the user who has input the query. In the first embodiment, the validity is estimated by the second model M2, and hence the second attribute and the second attribute value for which the validity is to be estimated by the second model M2 correspond to the second classification.

The second classification may be any estimation result of the first model M1, and is not limited to the second attribute and the second attribute value of the query. For example, the second classification may indicate only any one of the second attribute of the query and the second attribute value. The second classification may have any format and is not limited to being a character string. For example, the second classification may be information such as an ID or a number that can uniquely identify the classification. A combination of a plurality of second attributes and second attribute values may be treated as one second classification.

In the following description, the combination of the second attribute and the second attribute value is simply referred to as "second classification." In the first embodiment, when the user inputs a query, the second classification acquisition module 101 acquires a plurality of second classifications relating to the query. The second classification acquisition module 101 inputs the query input by the user to the first model M1. The first model M1 calculates a feature amount of the query. The first model M1 outputs a first score for each second classification which can be estimated by the first model M1.

The first score may also be referred to as "probability," "certainty," or "likelihood." A high first score means that the estimation result is valid (correct). Various methods may be used to calculate the first score. For example, when a neural network is used, the first score is calculated by the output layer. A first score acquisition module acquires the first score output by the first model M1. When another machine learning method is used, the first score may be calculated by a calculation method corresponding to the another machine learning method.

In the first embodiment, the second classification acquisition module 101 acquires the first score relating to the validity of the estimation result of the first model M1 for each second classification. In the example of FIG. 3 and FIG. 4, there are 32 second classifications, and hence the second classification acquisition module 101 acquires 32 first scores. The number of second classifications may be any number, and may be, for example, 31 or less or 33 or more. When the ranking determination system 1 is applied to a search service like in the first embodiment, because there are many second classifications, several hundred to several thousand or more first scores are actually acquired.

It is not required that the second classification acquisition module 101 acquire the first score. For example, when the first ranking is not particularly used, the second classification acquisition module 101 may acquire a combination of second classifications without acquiring the first score. In this case, the first model M1 may output only a combination of second classifications having first scores which are equal to or more than a threshold value, or may output only a predetermined number of second classifications in descending order of the first score. The first score may be a value only calculated internally in the first model M1. When the second classification can be output without using the first score, the first score is not required to be calculated.

[First Ranking Determination Module]

The first ranking determination module 102 determines, when the user inputs a query, a first ranking for a plurality of second classifications based on the first score for each second classification. The first ranking is a ranking relating to the estimation result obtained by the first model M1. For example, the first ranking determination module 102 determines the first ranking by sorting the plurality of second classifications acquired by the second classification acquisition module 101 in descending order of the first score.

In the example of FIG. 3 and FIG. 4, the first score of the second classification indicating the combination of the second attribute "Color" and the second attribute value "White" is the highest, and hence the first ranking determination module 102 determines that this second classification is ranked first. The first score of the second classification indicating the combination of the second attribute "Brand" and the second attribute value "Engineer" is the second highest, and hence the first ranking determination module 102 determines that this second classification is ranked second. Then, in the same way, the first ranking determination module 102 also determines the ranks for the first scores which are third highest and onwards. In the first embodiment, there is described a case in which the first ranking is aggregated d for all of the second classifications that can be estimated by the first model M1, but the first ranking may be aggregated for only a part of the second classifications. For example, the first ranking determination module 102 may determine the first ranking only for the second classifications having a first score which is equal to or more than a threshold value. As another example, the first ranking determination module 102 may select a predetermined number of second classifications in descending order of the first score, and determine the first ranking for only those selected second classifications.

For example, there may be a case in which the first model M1 has not sufficiently learned the web page of the fictitious apparel brand "White wind" and the web page of engineer boots. In such a case, as illustrated in FIG. 3 and FIG. 4, when the estimation results of the first model M1 are ranked in the order of first scores, the rank of the second classification indicating the combination of the second attribute "Brand" and the second attribute value "White wind" decreases, and the rank of the second classification indicating the combination of the second attribute "Shoes" and the second attribute value "Engineer boots" decreases.

The first model M1 may output the first ranking. In this case, the first ranking determination module 102 may cause the first model M1 to determine the first ranking. For example, when the output layer of the first model M1 is set so that the second classifications are arranged in descending order of the first score and output as the first ranking, the first model M1 can be caused to output the first ranking. In this case, the determination of the first ranking is completed internally in the first model M1, and thus the first ranking determination module 102 is only required to acquire the first ranking output from the first model M1.

[Second Score Acquisition Module]

The second score acquisition module 103 acquires, for each second classification, a second score relating to the validity of a combination of the second data and the second classification based on the second model M2 which has learned the validity of a combination of third data and a third classification relating to the third data. The learning processing for causing the second model M2 to learn this validity is described later in relation to the first learning module 301.

In the first embodiment, a past query input into a past search corresponds to the third data. Thus, in the description of the first embodiment, "past query" can be read as "third data." The third data is the input portion of the training data of the second model M2. The third data may be any data that can be used in the learning of the second model M2, and the third data is not limited to a past query. For example, the third data may be the title of the web page, a character string other than the title included in the web page, a keyword used as an index of the web page, or a summary created from the web page.

In the first embodiment, there is described a case in which the title of the web page that can become an index also corresponds to the third data, but the third data may be data that is not particularly used as an index. For example, the third data may be, of the character strings included in the web page, a character string that does not serve as an index. In place of being a character string itself, the third data may be a feature amount indicating some kind of feature of a character string. The third data may have any format and is not limited to being a character string. For example, the third data may be image data, moving image data, document data, audio data, or any other data, or may be a feature amount, a vector representation, or an embedded representation which is based on at least a part of one or more pieces of data selected from a data group including image data, moving image data, document data, audio data, or any other data.

In the first embodiment, a classification relating to a result of selection from past search results corresponds to the third classification. For example, a combination of the attribute and the attribute value associated with the web page selected from past search results corresponds to the third classification. This attribute is hereinafter referred to as "third attribute." Thus, in the description of the first embodiment, "combination of the third attribute and the third attribute value" can be read as "third classification." The third classification is information capable of classifying the third data. The third classification is the output portion of the training data of the second model M2.

In the first embodiment, there is described a case in which the third classification is an index that is usable in the search processing, but the third classification may be any information that can be used in the learning of the second model M2, and can be data that is not in particular used as an index. For example, the third classification may be only any one of the third attribute or the third attribute value. The third classification may have any format and is not limited to being a character string. For example, the third classification may be information such as an ID or a number that can uniquely identify the classification. A combination of a plurality of third attributes and third attribute values may be treated as one third classification. In the following description, the combination of the third attribute and the third attribute value is simply referred to as "third classification."

In the first embodiment, when the user inputs a query, the second score acquisition module 103 acquires a second score for each second classification. The second score acquisition module 103 inputs a combination of the query input by the user and the second classification estimated by the first model M1 to the second model M2. The second model M2 calculates the feature amount of this combination. The second model M2 outputs a second score for each combination.

The second score may also be referred to as "probability," "certainty," or "likelihood." A high second score means that the combination is valid (correct). Various methods may be used to calculate the second score. For example, when a neural network is used, the second score is calculated by the output layer. The second score acquisition module 103 acquires the second score output by the second model M2. When another machine learning method is used, the second score may be calculated by a calculation method corresponding to the another machine learning method.

In the example of FIG. 3 and FIG. 4, there are 32 combinations of queries and second classifications. The second score acquisition module 103 acquires 32 second scores. There may be any number of combinations of queries and second classifications. For example, there may be 31 or less combinations or 33 or more combinations. The second score is not required to be output from the second model M2, and may be only calculated internally in the second model M2. In this case, the output from the second model M2 may be the second ranking in place of the second score.

When the ranking determination system 1 is applied to a search service like in the first embodiment, because there are many second classifications, several hundred to several thousand or more second scores are actually acquired. The second score may be acquired for all second classifications acquired by the second classification acquisition module 101, or the second score may be acquired only for a part of those second classifications. For example, the second score may be acquired only for the second classifications having a first ranking which is equal to or higher than a predetermined rank.

[Second Ranking Determination Module]

The second ranking determination module 104 determines a second ranking for a plurality of second classifications based on the second score of each second classification. In the first embodiment, the second ranking determination module 104 determines the second ranking when the user inputs a query. The second ranking is a ranking relating to the estimation result obtained by the second model M2. The second ranking determination module 104 determines the second ranking by sorting the plurality of second classifications acquired by the second classification acquisition module 101 in descending order of the second score.

In the example of FIG. 4, the second score for the query "white wind engineer boots" and the second classification indicating the combination of the second attribute "Brand" and the second attribute value "White wind" is the highest, and hence the second ranking determination module 104 determines that this combination is ranked first. The second score for the query "white wind engineer boots" and the second classification indicating the combination of the second attribute "Shoes" and the second attribute value "Engineer boots" is the second highest, and hence the second ranking determination module 104 determines that this combination is ranked second. Then, in the same way, the second ranking determination module 104 determines the ranks for the second scores which are third highest and onwards.

In the first embodiment, there is described a case in which the second ranking is aggregated for all of the second classifications that can be estimated by the first model M1, but the second ranking may be aggregated for only a part of the second classifications. For example, the second ranking determination module 104 may determine the second ranking only for the second classifications having a first score or a second score which is equal to or more than a threshold value. As another example, the second ranking determination module 104 may select a predetermined number of second classifications in descending order of the first score or the second score, and determine the second ranking for only those selected second classifications.

The second model M2 may output the second ranking. In this case, the second ranking determination module 104 may cause the second model M2 to determine the second ranking. For example, when the output layer of the second model M2 is set so that the second classifications are arranged in descending order of the second score and output as the second ranking, the second model M2 can be caused to output the second ranking. In this case, the determination of the second ranking is completed internally in the second model M2, and thus the second ranking determination module 104 is only required to acquire the second ranking output from the second model M2.

[Search Module]

The search module 105 executes, when the user inputs a query, search processing based on the query and the second ranking determined by the second ranking determination module 104. In the first embodiment, the search module 105 executes, when the user inputs a query, the search processing based on the query, the first ranking, and the second ranking. That is, not only the second ranking but also the first ranking is used in the search processing.

In the first embodiment, the search module 105 selects the second classifications to be used in the search processing based on the first ranking and the second ranking. For example, the search module 105 selects second classifications having a first ranking which is ranked relatively high and second classifications having a second ranking which is ranked relatively high. The search module 105 may select second classifications having both a first ranking which is ranked relatively high and a second ranking which is ranked relatively high. Ranked relatively high means that the rank is equal to or higher than a predetermined rank. This predetermined rank may be any rank, and may be about fifth, for example. The predetermined rank may be a fixed value, or may be determined dynamically, such as about the top 10%, in accordance with the number of second classifications for which rankings have been aggregated.

The search module 105 calculates a search score of the web page based on the query input by the user, the selected second classifications, and the index stored in the page database DB1. The search score indicates a degree of matching between the query and the index. As the search score calculation method itself, calculation methods employed by various search engines can be applied. The search module 105 selects a predetermined number of web pages in descending order of the search score, and generates a search results page P2 including links to the selected web pages.

The search module 105 transmits the data of the search results page P2 to the user terminal 20. When the search module 105 receives a result of selection by the user from the user terminal 20, the search module 105 causes the user terminal 20 to access the web page corresponding to the link selected by the user. The search module 105 records, in the data storage module 100, the relationship between the query input by the user and the web page corresponding to the link selected by the user. This relationship corresponds to the selection log database DB4 described later.

The search module 105 may execute the search processing based on the second ranking without using the first ranking. In this case, the search server 10 does not include the first ranking determination module 102. For example, the search module 105 selects the second classifications to be used in the search processing based on the second ranking without using the first ranking. For example, the search module 105 selects second classifications having a second ranking which s ranked relatively high. The rest of the search processing is the same as in the case of using the first ranking.

[1-3-2. Functions to be Implemented by User Terminal]

A data storage module 200 is implemented by the storage 22. A display control module 201 and a reception module 202 are implemented by the controller 21.

[Data Storage Module]

The data storage module 200 stores the data required in order to provide the search service to the user. For example, the data storage module 200 stores a browser for displaying the top page P1 and the search results page P2. The screen displayed on the user terminal 20 may use an application dedicated to the search service in place of a browser. In this case, the data storage module 200 stores the application.

[Display Control Module]

The display control module 201 displays various screens on the display unit 25. For example, when the display control module 201 receives the data of the top page P1 from the search server 10, the display control module 201 displays the top page P1 on the display unit 25. When the display control module 201 receives the data of the search results page P2 from the search server 10, the display control module 201 displays the search results page P2 on the display unit 25.

[Reception Module]

The reception module 202 receives various operations from the operation unit 24. For example, the reception module 202 receives input of a query to the input form F10 of the top page P1. The user terminal 20 transmits the input query to the search server 10. For example, the reception module 202 receives a selection of a link included in the search results indicated by the search results page P2. The user terminal 20 transmits the selected link to the search server 10.

[1-3-3. Functions to be implemented by Learning Terminal]

A data storage module 300 is implemented by the storage 32. The first learning module 301 and the second learning module 302 are implemented by the controller 31.

[Data Storage Module]

The data storage module 300 stores the data required for the learning processing of the first model M1 and the second model M2. For example, the data storage module 300 stores a training database DB2, a query database DB3, and a selection log database DB4.

FIG. 7 is a table for showing an example of the training database DB2. The training database DB2 is a database in which the training data for the first model M1 is stored. The training data for the first model M1 includes pairs of an input portion and an output portion. The input portion of the training data for the first model M1 has the same format as that of the data actually input to the first model M1. In the first embodiment, a character string indicating the query is input to the first model M1, and thus the input portion of the training data for the first model M1 is a character string.

The output portion of the training data for the first model M1 has the same format as that of the data actually output from the first model M1. In the first embodiment, a combination of a character string indicating the second attribute and a character string indicating the second attribute value is output from the first model M1, and thus the output portion of the training data for the first model M1 includes a combination of a character string indicating the first attribute and a character string indicating the first attribute value.

In the first embodiment, the training data for the first model M1 is created based on the page database DB1. For example, the learning terminal 30 acquires the title of the web page stored in the page database DB1 as the input portion of the training data. The learning terminal 30 acquires the first attribute and first attribute value associated with this title as the output portion of the training data. The learning terminal 30 stores the pair of the input portion and the output portion as training data in the training database DB2.

FIG. 8 is a table for showing an example of the query database DB3. The query database DB3 is a database which stores past queries input in the past by an unspecified number of users. For example, each time search processing is executed, the search server 10 accumulates the query used in the search processing in the data storage module 100 as a past query. The learning terminal 30 acquires the past queries accumulated in the data storage module 100 and stores the acquired past queries in the query database DB3.

FIG. 9 is a table for showing an example of the selection log database DB4. The selection log database DB4 is a database which stores selection log data. The selection log data is data indicating the selection results for past queries. The selection log data may also be referred to as "query click log." For example, the selection log database DB4 stores past queries in association with page information. Further, the past queries in the selection log data may be associated with, among the pieces of page information on the web pages selected by the user in the search results of the past queries, a piece of page information indicating a product for which the user performed a transaction, for example, a purchase or a contract. In this case, the page information associated with the past queries in the selection log data may be page information indicating the product for which a transaction, for example, a purchase or a contract, was performed within a predetermined time after the selection of the web page by the user. In addition, the past queries in the selection log data may be associated with, among the pieces of page information on the web pages selected by the user in the search results of the past queries, a piece of page information indicating a product registered in a predetermined list, for example, a favorites list or a shopping basket (basket) by the user. In this case, the page information associated with the past queries in the selection log data may be page information indicating the product registered in a predetermined list, for example, a favorites list or a shopping basket (basket) by the user following selection of the web page by the user. The past queries in the selection log data may be associated with page information on the web pages selected by a plurality of users or a predetermined number of users or more in the search results of a common past query, or may be associated with page information on the web pages selected a predetermined number of times or more by one or a plurality of users with a predetermined period in the search results of a common past query.

The page information is information relating to a web page. The web page is the web page indicated by the link selected on the search results page P2 by the user who input the past query. This web page is actually selected by the user, and hence it can be said that the web page is in line with the intention of the user. For example, the page information includes the title of the web page, the third attribute, and the third attribute value. The third attribute and the third attribute value associated with the title of a certain web page are the same as the first attribute and the first attribute value associated with the title of the web page stored in the page database DB1 or the training database DB2. The page information may include any information, and may include, for example, the URL of the web page and the browsing date and time.

The data storage module 200 stores the first model M1 and the second model M2 before learning. For example, the first model M1 and the second model M2 before learning are the first model M1 and the second model M2 in which the parameters are initial values. When the learning processing is in progress, the data storage module 200 stores the first model M1 and the second model M2 that are in the process of learning. When the learning processing has been executed, the data storage module 200 stores the trained first model M1 and second model M2. This series of the first model M1 and second model M2 have the same data, but the parameters are gradually updated.

[First Learning Module]

Figure 10:
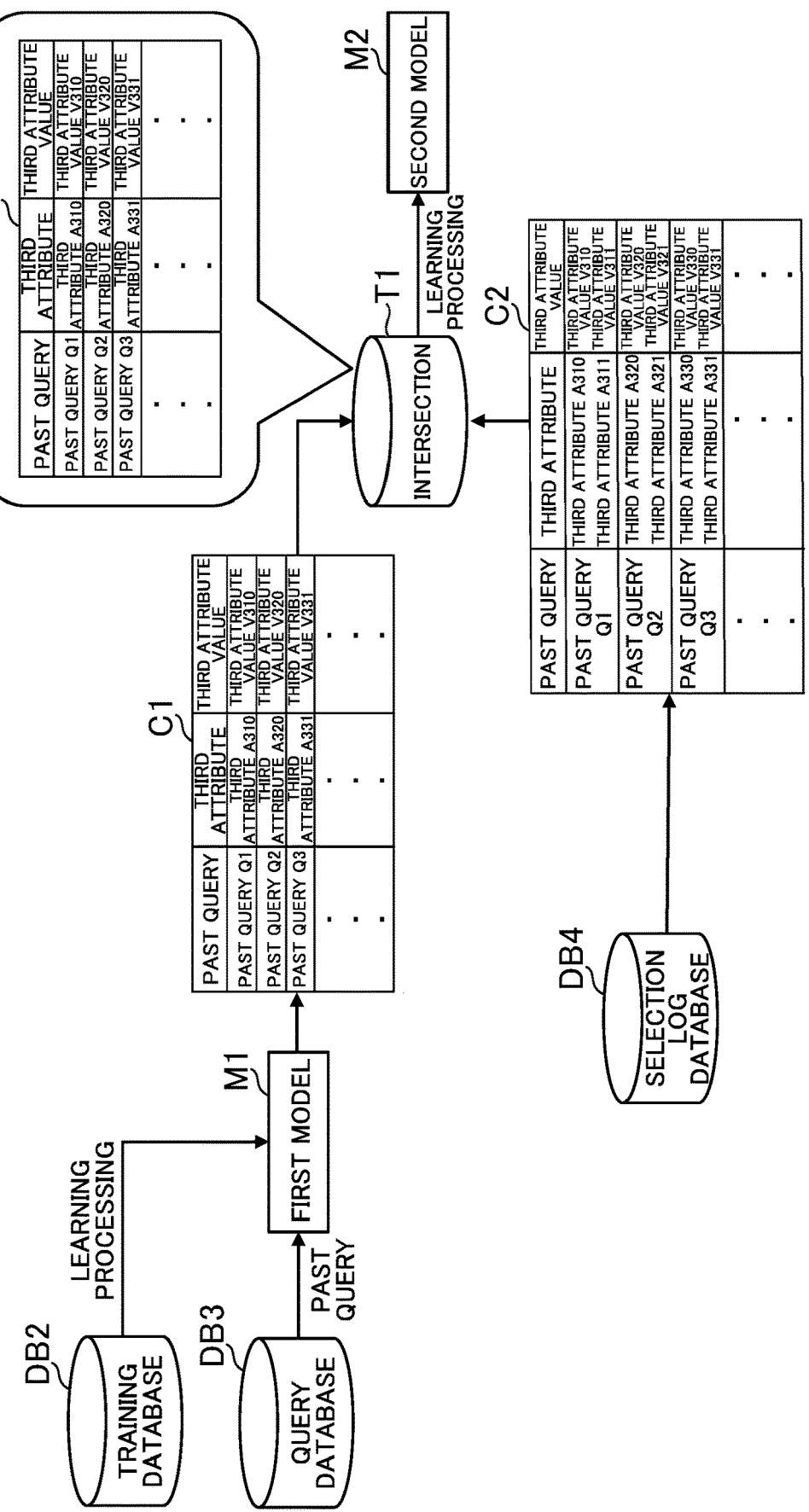
FIG. 10 is a diagram for illustrating an example of a learning method of the first model and the second model.

FIG. 10 is a diagram for illustrating an example of a learning method of the first model M1 and the second model M2. The first learning module 301 executes the learning processing of the first model M1. In the first embodiment, the data stored in the training database DB2 is used as the training data for the first model M1. The first learning module 301 executes the learning processing of the first model M1 based on this training data. For example, the first learning module 301 execute the learning processing of the first learning model M1 so that the first attribute and the first attribute value, which are the output portion of the training data, are output when the title of the web page, which is the input portion of the training data, is input. Various algorithms can be used for the learning processing itself of the first model M1. For example, an error backpropagation method or a gradient descent method can be used.

The learning processing of the first model M1 is not limited to the example described above. For example, the first learning module 301 may cause the first model M1 on which the learning processing using the training database DB2 has been executed to learn additional training data. Various methods can be used for generating the additional training data. For example, the first learning module 301 may input the past queries stored in the query database DB3, and estimate the validity of the estimation result of the first model M1 based on a predetermined estimation method. The first learning module 301 may generate the additional training data based on the estimation result.

[Second Learning Module]

The second learning module 302 executes the learning processing of the second model M2. In the first embodiment, the data stored in the selection log database DB4 is used as the training data for the second model M2. The second learning module 302 executes the learning processing of the second model M2 based on this training data. For example, the second learning module 302 execute the learning processing of the second model M2 such that when a combination of a query, the third attribute, and the third attribute value, which is the input portion of the training data, is input, the validity regarding the combination is output. In the first embodiment, the learning processing of the second model M2 is executed so as to obtain the estimation result in which all combinations stored in the selection log database DB4 are valid.

In the example of FIG. 10, the output of the first model M1 is also used as the training data for the second model M2. The second learning module 302 inputs the past queries stored in the query database DB3 to the trained first model M1. The second learning module 302 acquires the estimation result from the first model M1. In the example of FIG. 10, only the estimation results having a first score which is equal to or more than a threshold value are used as the third attribute and the third attribute value. The second learning module 302 acquires the past queries and the third attributes and third attribute values, which are the estimation results having a first score equal to or more than the threshold value, as training data candidates C1.

The second learning module 302 acquires all or a part of the selection log database DB4 as training data candidates C2. The second learning module 302 acquires the intersection of the candidates C1 and the candidates C2 as a training data group T1 for the second model M2. The intersection is the AND of the candidates C1 and the candidates C2. The second learning module 302 executes the learning processing of the second model M2 based on the acquired training data group T1. For example, the second learning module 302 executes the learning processing of the second model M2 such that when the combination of a past query, the third attribute, and the third attribute value included in the training data group T1 of FIG. 10 is input to the second model M2, an output (a high second score) indicating that the combination is valid is obtained. Various algorithms can be used for the learning processing itself of the second model M2. For example, an error backpropagation method or a gradient descent method can be used.

The learning processing of the second model M2 is not limited to the example described above. For example, the second learning module 302 may execute the learning processing of the second model M2 by using only the candidates C2. For example, the second learning module 302 may execute the learning processing of the second model M2 by using only the candidates C1. As another example, the second learning module 302 may execute the learning processing of the second model M2 by using a database of training data that does not include the candidates C1 or the candidates C2.

[1-4. Processing Executed by Ranking Determination System]

Figure 11:
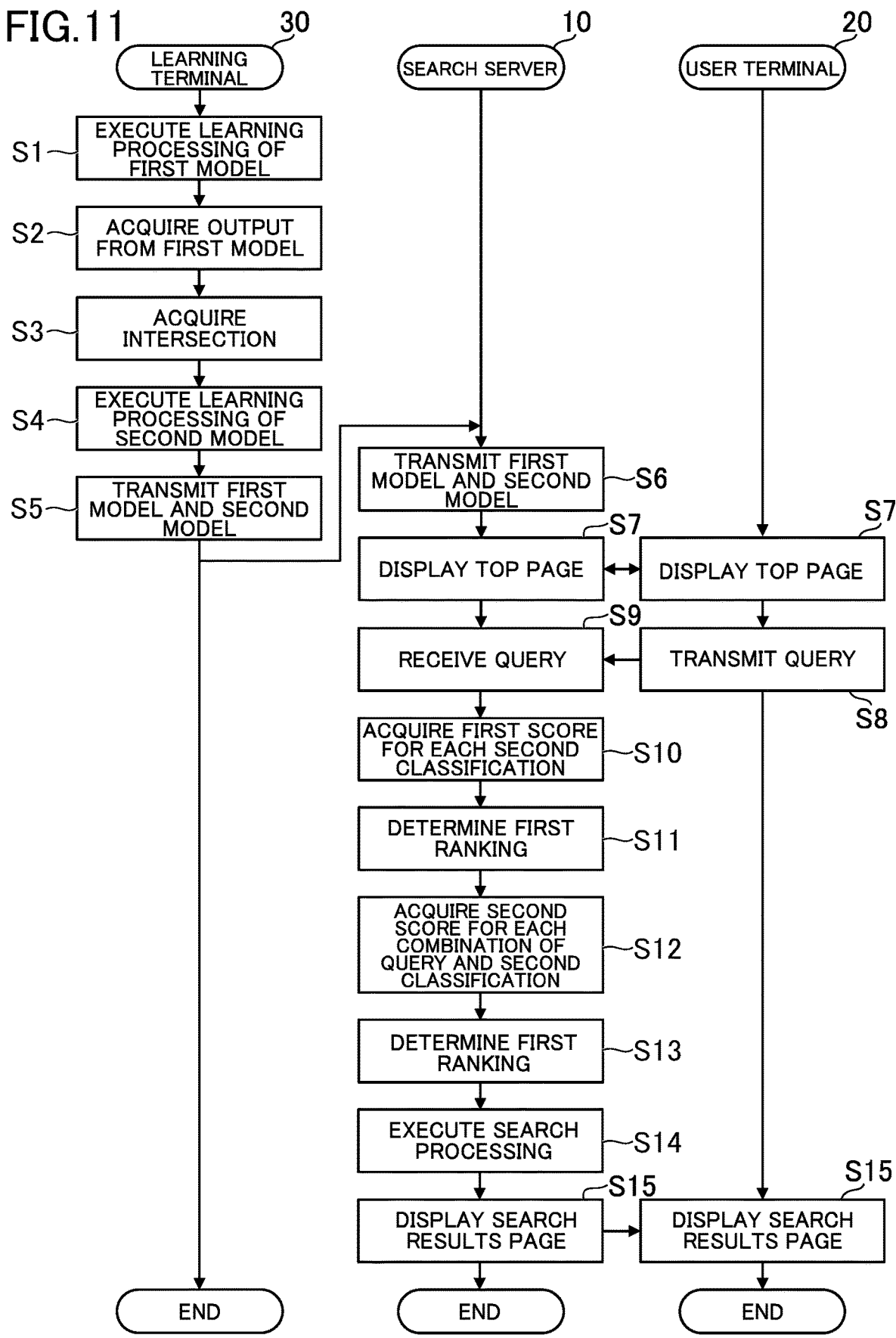
FIG. 11 is a flowchart for illustrating an example of processing executed by the ranking determination system.

FIG. 11 is a flowchart for illustrating an example of processing executed by the ranking determination system 1. This processing is executed by the controllers 11, 21, and 31 operating in accordance with programs stored in the storages 12, 22, and 32.

As illustrated in FIG. 11, the learning terminal 30 executes the learning processing of the first model M1 based on the training database DB2 (Step S1). The learning terminal 30 acquires the output from the first model M1 based on the query database DB3 and the first model M1 on which the learning processing is executed in Step S1 (Step S2). The learning terminal 30 acquires the intersection between the selection log database DB4 and the output from the first model M1 acquired in Step S2 (Step S3).

The learning terminal 30 executes the learning processing of the second model M2 based on the intersection acquired in Step S3 (Step S4). The processing steps of from Step S1 to Step S4 are the learning processing described with reference to FIG. 10. Through executing the processing steps of from Step S1 to Step S4, creation of the trained first model M1 and second model M2 is complete. The learning terminal 30 transmits, to the search server 10, the first model M1 on which the learning processing is executed in Step S1 and the second model M2 on which the learning processing is executed in Step S4 (Step S5).

When the search server 10 receives the first model M1 and the second model M2 from the learning terminal 30, the search server 10 records the received first model M1 and second model M2 in the storage 12 (Step S6). The first model M1 and the second model M2 are thereafter usable in the search service. The user terminal 20 accesses the search server 10, and displays the top page P1 on the display unit 25 (Step S7). The user terminal 20 transmits the query input in the input form F10 by the user to the search server 10 (Step S8).

The search server 10 receives the query input by the user (Step S9), and acquires the first score for each second classification based on the query and the first model M1 (Step S10). The search server 10 determines the first ranking based on the first score acquired in Step S10 (Step S11). In Step S11, the search server 10 determines the first ranking by rearranging the second classifications in descending order of the first score.

The search server 10 acquires, based on the query input by the user, the second classification estimated by the first model M1, and the second model M2, the second score for each combination of the query and the second classification (Step S12). The search server 10 determines the second ranking based on the second score acquired in Step S12 (Step S13). In Step S13, the search server 10 determines the second ranking by rearranging the second classifications in descending order of the second score.

The search server 10 executes the search processing of the page database DB1 based on the query received in Step S9, the first ranking determined in Step S11, and the second ranking determined in Step S13 (Step S14). In Step S14, the search server 10 executes the search processing of the page database DB1 by using, as a final query, the query input by the user and second classifications having a first ranking which is ranked relatively high or second ranking which is ranked relatively high. The user terminal 20 receives the search results from the search server 10, displays the search results page P2 on the display unit 25 (Step S15), and ends this processing.

The ranking determination system 1 of the first embodiment acquires a plurality of second classifications based on the first model M1. The ranking determination system 1 acquires the second score for each second classification based on the second model M2. The ranking determination system 1 determines the second ranking for each of the plurality of second classifications based on the second score of each second classification. As a result, it is possible to evaluate the estimation result of the first model M1 by using the second model M2 on which learning processing has been executed from a point of view different from that of the first model M1, and thus the second classification ranking can be determined accurately.

Further, when the user inputs a query, the ranking determination system 1 acquires the second classifications, acquires the second scores, and determines the second rankings. When the user inputs a query, the ranking determination system 1 executes the search processing based on the query and the second ranking. As a result, the search processing can be executed after the second classification, which is the estimation result of the intention of the user, is added to the query input by the user, and thus the accuracy of the search processing is increased. For example, by adding a second classification having a second ranking which is ranked relatively high, the search processing can be executed based on a more accurate estimation of the intention of the user, and thus search results which reflect the intention of the user can be presented to the user.

Further, when the user inputs a query, the ranking determination system 1 executes processing of acquiring the first score for each second classification and processing of determining the first ranking based on the first score of each second classification. When the user inputs a query, the ranking determination system 1 executes the search processing based on the query, the first ranking, and the second ranking. As a result, not only the second ranking but also the first ranking can be reflected in the search processing, and thus the accuracy of the search processing is further increased. For example, in some cases the first ranking may be reliable to a certain extent, by using both the first ranking and the second ranking in the search processing, search results which better reflect the intention of the user can be presented to the user.

Further, the first data is an index which is usable in the search processing. The first classification is a classification related to the index. The third data is a past query input in a past search. The third classification is a classification relating to a selection result in the results of the past search. As a result, the first model M1 and the second model M2 can be created by using the index actually used in the search processing and past queries that have actually been input, thus saving the time and effort of preparing the training data. In addition, because the data actually used in the search service can be used, a highly accurate first model M1 and second model M2 that match the actual situation of the search service can be created.

2. Second Embodiment

Situations in which the ranking determination system 1 may be applied are not limited to the example of the first embodiment. The ranking determination system 1 can be applied in any situation. In the second embodiment, a case in which the ranking determination system 1 is applied in order to generate the training data for the first model M1 is taken as an example. In the second embodiment, descriptions of the same points as in the first embodiment are omitted.

In the second embodiment, the second model M2 is used to generate the training data for the first model M1. Thus, it is assumed that the second model M2 is not used when the search processing is executed. The search server 10 does not store the second model M2. For example, when the user inputs a query on the top page P1, the search server 10 acquires the second classifications based on the query and the first model M1.

For example, the search server 10 executes the search processing based on the query input by the user and the second classifications having a relatively high first score. The second classifications having a relatively high first score are second classifications having a first ranking equal to or higher than a predetermined rank. When the accuracy of the first model M1 is sufficiently high, highly accurate search processing can be executed even when the search processing is executed as in the second embodiment. In the second embodiment, in order to improve the accuracy of the first model M1, the training data is generated by using the second model M2.

Figure 12:
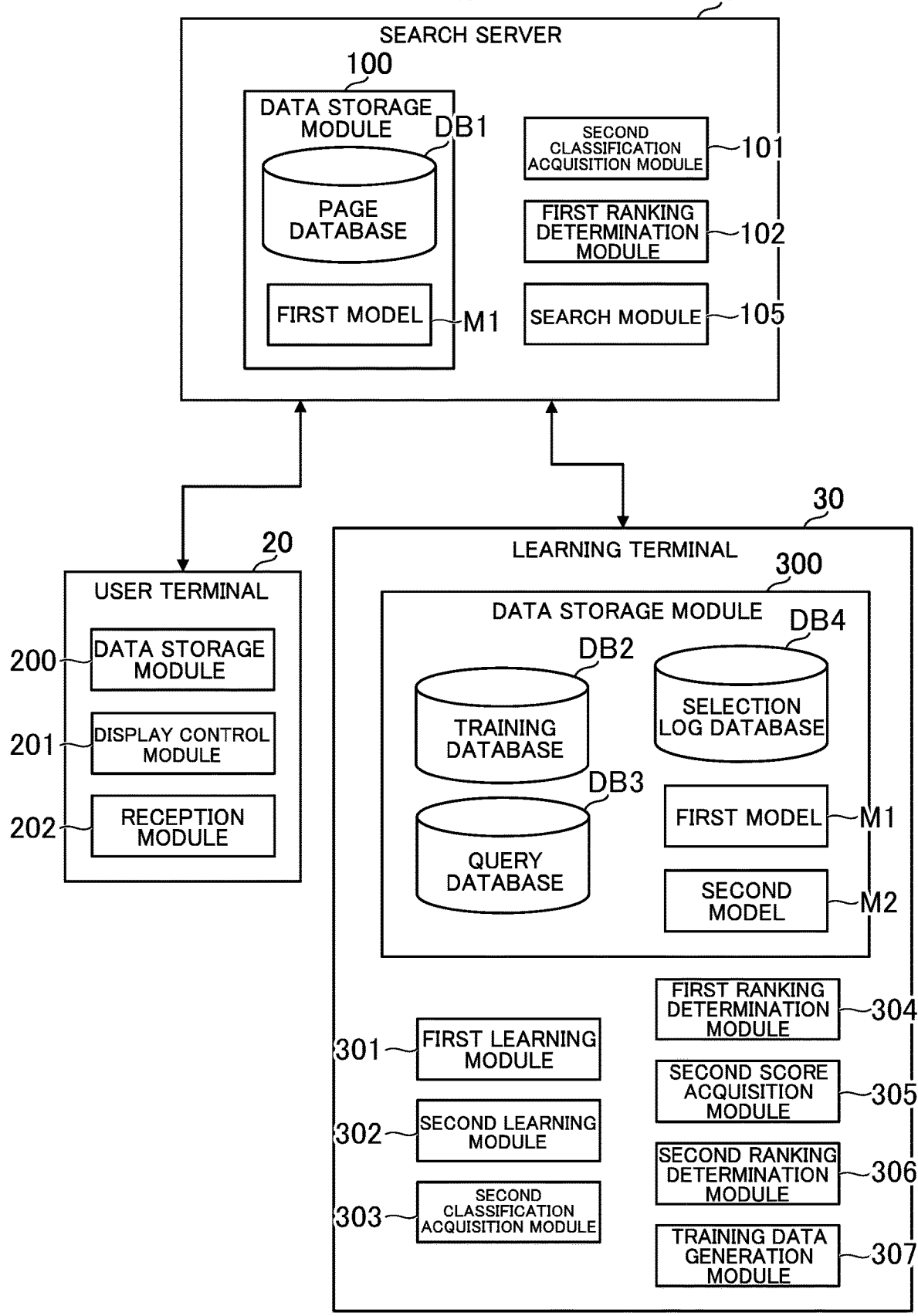
FIG. 12 is a diagram for illustrating an example of functional blocks in a second embodiment of the present disclosure.

FIG. 12 is a diagram for illustrating an example of functional blocks in the second embodiment. The ranking determination system 1 includes a training data generation module 307. In the second embodiment, a second classification acquisition module 303, a first ranking determination module 304, a second score acquisition module 305, and a second ranking determination module 306 are implemented in the learning terminal 30. Each of those functions is implemented by the controller 31. In the second embodiment, the search server 10 does not include the second score acquisition module 103 and the second ranking determination module 104.

Figure 13:
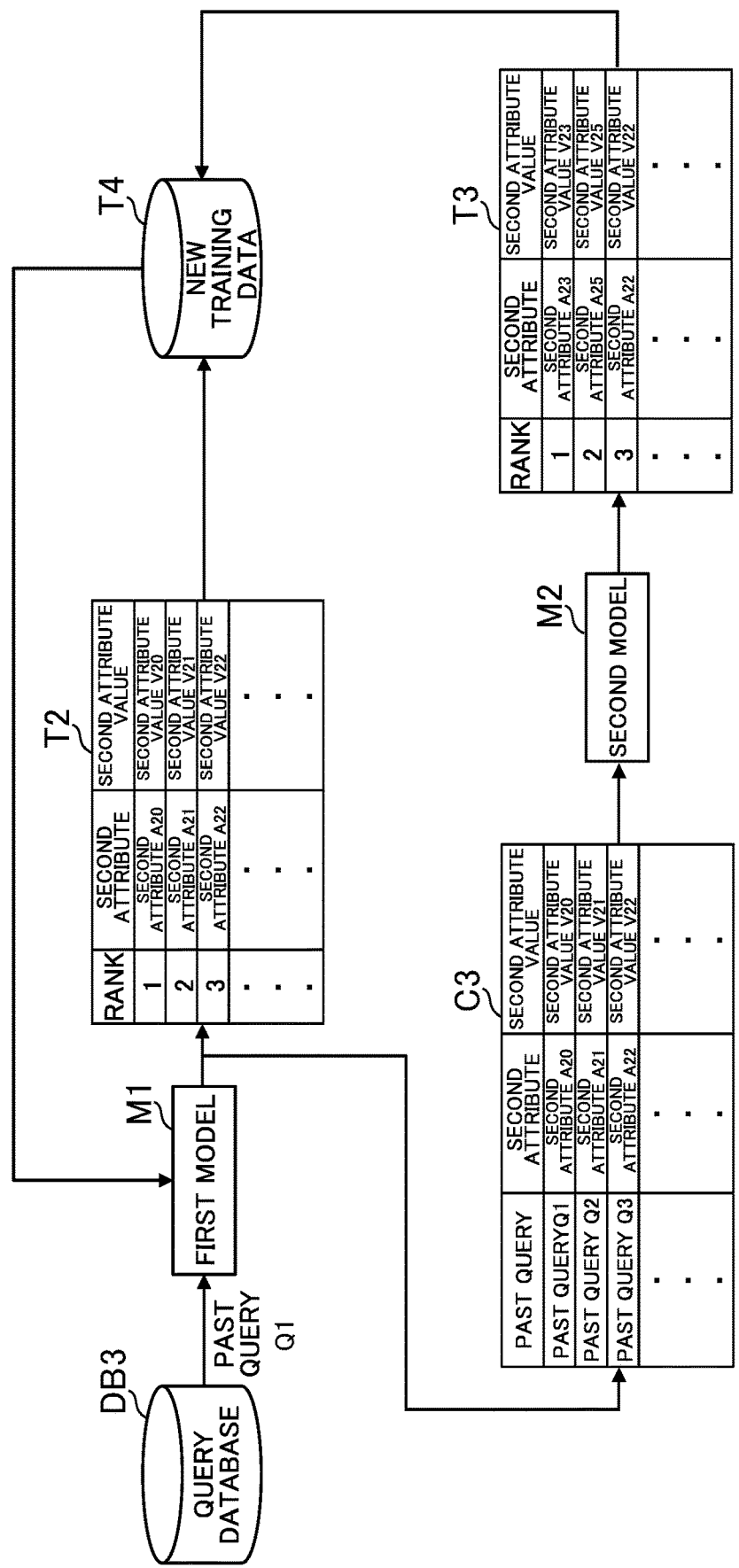
FIG. 13 is a diagram for illustrating an example of a flow in which training data is generated in the second embodiment.

FIG. 13 is a diagram for illustrating an example of a flow of generating the training data in the second embodiment. Each function of FIG. 12 is now described with reference to FIG. 13. For example, the training data generation module 307 generates the training data for the first model M1 to learn based on the second data and the second ranking. In the second embodiment, the training data generation module 307 generates the training data based on the first ranking and the second ranking. That is, not only the second ranking but also the first ranking is used to generate the training data.

In the second embodiment, as in the first embodiment, the first learning module 301 executes the learning processing of the first model M1 based on the training database DB2. This learning processing is the same as in the first embodiment. In the second embodiment, the first model M1 created by this learning processing is not stored in the search server 10. Firstly, the accuracy of the first model M1 is increased by the processing described below, and then the first model M1 is stored in the search server 10. The learning method of the second model M2 may be the same as in the first embodiment.

The meaning of the second data is as described in the first embodiment, but in the second embodiment, the second data is a past query. Thus, in the description of the second embodiment, "past query" can be read as "second data." The second classification acquisition module 303 acquires the second classifications of a past query based on the first model M1 and the past query. For example, as illustrated in FIG. 13, the second classification acquisition module 303 inputs a past query stored in the query database to the first model M1. The second classification acquisition module 303 acquires the second classifications output from the first model M1.

In the second embodiment, each second classification is a second attribute and a second attribute value of a past query. The first model M1 calculates the first score for each second classification in the same manner as in the first embodiment. The first ranking determination module 304 determines the first ranking in the same manner as in the first embodiment. For example, as illustrated in FIG. 13, the training data generation module 307 acquires combinations of past queries and second classifications having a first ranking which is ranked relatively high (for example, combinations ranked fifth or higher) as a training data group T2.

The second score acquisition module 305 acquires the second score relating to the validity of the combinations of past queries and second classifications in the same manner as in the first embodiment. The second ranking determination module 306 determines the second ranking in the same manner as in the first embodiment. In the example of FIG. 13, the second score acquisition module 305 inputs the individual combinations included in candidates C3, which are combinations of the past queries input to the first model M1 and the second classifications output from the first model M1, into the second model M2. As illustrated in FIG. 13, the training data generation module 307 acquires combinations of past queries and second classifications having a second ranking which is ranked relatively high (for example, combinations ranked fifth or higher) as a training data group T3.

For example, the training data generation module 307 acquires a training data group T4 for additional learning by the first model M1 based on the training data group T2 and the training data group T3. In the example of FIG. 13, the training data generation module 307 acquires, as the training data group T4, combinations of past queries and second classifications having a first ranking which is ranked relatively high as well as combinations of past queries and second classifications having a second ranking which is ranked relatively high. The training data generation module 307 may acquire the intersection between those combinations as the training data group T4. The first learning module 301 causes the first model M1 to learn the training data group T4. The learning processing itself of the training data group T4 is the same as the learning processing of the training data stored in the training database DB2.

The training data generation module 307 may generate the training data based on the second ranking without using the first ranking. In this case, the learning terminal 30 does not include the first ranking determination module 304. For example, the training data generation module 307 selects the second classifications to be used as the training data based on the second ranking without using the first ranking. For example, the training data generation module 307 may select, as the training data group T4, combinations of past queries and second classifications having a second ranking which is ranked relatively high as they are. The rest of the learning processing is the same as in the case of using the first ranking.

The ranking determination system 1 of the second embodiment generates the training data to be learned by the first model M1 based on the second data and the second ranking. As a result, the first model M1 learns training data having a second ranking which is ranked relatively high, and thus the accuracy of the first model M1 is increased. In addition, the creation of the training data for the first model M1 to learn can be automated, and thus the time and effort required to prepare the training data for the first model M1 can be saved.

Further, the ranking determination system 1 generates the training data based on the first ranking and the second ranking. As a result, the training data for the first model M1 can be created by considering not only the second ranking but also the first ranking, and thus the first model M1 can learn more accurate training data. As a result, the accuracy of the first model M1 is increased.

3. Modification Examples

The present disclosure is not limited to the first and second embodiments described above, and modifications can be made as appropriate without departing from the spirit of the present disclosure.

3-1. Modification Examples Relating to First Embodiment

Figure 14:
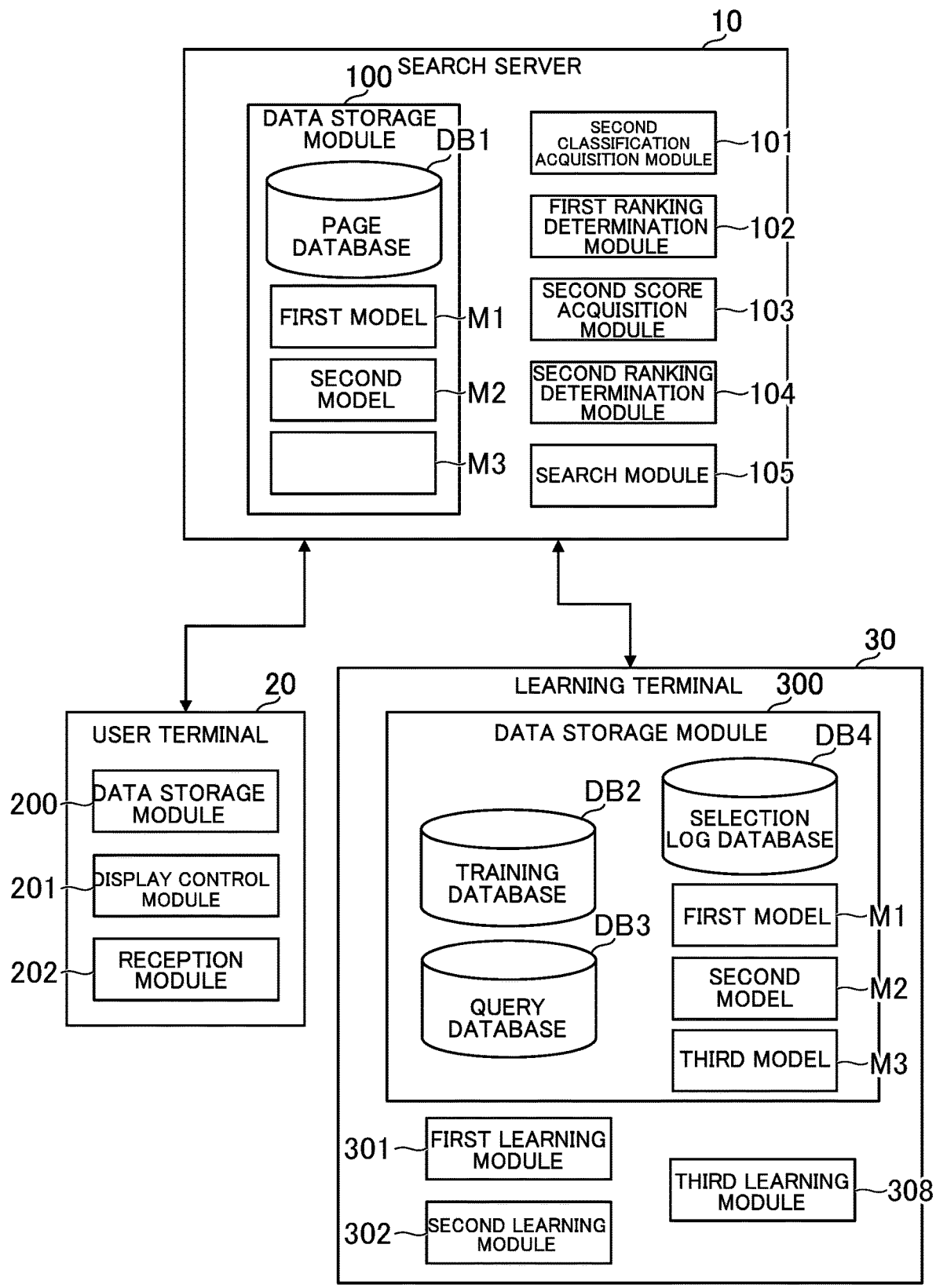
FIG. 14 is a diagram for illustrating an example of functional blocks in modification examples relating to a first embodiment of the present disclosure.

FIG. 14 is a diagram for illustrating an example of functional blocks in modification examples relating to the first embodiment. In the modification examples relating to the first embodiment, a third learning module 308 is implemented. The third learning module 308 is implemented by the controller 31. In the modification examples relating to the first embodiment, the first ranking and the second ranking are determined during execution of the search processing, as in the first embodiment.

Modification Example 1-1

For example, the search module 105 may determine a third ranking for a plurality of second classifications based on the first ranking, the second ranking, and a third model M3, and execute the search processing based on the query input by the user and the determined third ranking. Like the first model M1 and the second model M2, the third model M3 can use various machine learning methods. The third model M3 may be a model which uses methods other than machine learning. For example, the third model M3 may be data having a table format which defines a relationship between the first ranking, the second ranking, and the third ranking.

The third model M3 has learned the relationship between the first ranking, the second ranking, and the third ranking. This relationship is defined in the training data for the third model M3. Assuming that the training data for the third model M3 is stored in the data storage module 300, the third learning module 308 executes the learning processing of the third model M3 such that when the first ranking and second ranking included in certain training data are input, the third ranking included in that training data is output. As the learning processing itself of the third model M3, learning processing employing various machine learning methods can be used in the same way as for the first model M1 and the second model M2.

For example, the search module 105 inputs a pair of the first ranking and the second ranking to the trained third model M3. The third model M3 outputs a third ranking corresponding to the pair of the first ranking and the second ranking. The second classifications may also be input to the third model M3 in addition to the pair of the first ranking and the second ranking. In this case, it is assumed that the third model M3 has also learned the second classifications. The search module 105 acquires a third ranking which also considers the second classifications.

For example, the search module 105 executes the search processing based on the query input by the user and the second classifications having a ranking which third is ranked relatively high (for example, the second classifications having a third ranking equal to or higher than a predetermined rank). Modification Example 1-1 is different from the first embodiment in that the third ranking is used, but the rest of the search processing is the same as in the first embodiment.

The ranking determination system 1 of Modification Example 1-1 determines the third ranking for a plurality of the second classifications based on the first ranking, the second ranking, and the third model M3. The ranking determination system 1 executes the search processing based on the query and the determined third ranking. For example, when the second classifications having a first ranking which is ranked relatively high as well as the second classifications having a second ranking which is ranked relatively high are used in the search processing, the number of second classifications becomes large, and hence there is a possibility that there are no hits in the search processing. However, when the search processing is executed by summarizing into one ranking referred to as the third ranking, the minimum number of second classifications can be used in the search processing, and thus the accuracy of the search processing is increased. Further, it is possible to prevent second classifications which are not required from being used in the search processing, and thus the search processing can be speeded up.

Modification Example 1-2

For example, the search module 105 may determine the third ranking based on the first score for each second classification, the second score for each second classification, the first ranking, the second ranking, and the third model M3. In this case, the third model M3 has learned the relationship between the first score, the second score, the first ranking, the second ranking, and the third ranking. This relationship is defined in the training data for the third model M3. The learning processing itself of the third model M3 is as described in Modification Example 1-1.

The search module 105 inputs the first score for each second classification, the second score for each second classification, the first ranking, and the second ranking to the trained third model M3. The third model M3 outputs the third ranking corresponding to the combination of the first score for each second classification, the second score for each second classification, the first ranking, and the second ranking. The search module 105 acquires the third ranking which also takes into consideration the first score and the second score. The search processing by the search module 105 after the third ranking is acquired is the same as in Modification Example 1-1.

The ranking determination system 1 of Modification Example 1-2 determines the third ranking based on the first score for each second classification, the second score for each second classification, the first ranking, the second ranking, and the third model M3. As a result, the third ranking can be determined accurately, and hence the accuracy of the search processing is further increased.

Modification Example 1-3

For example, the search module 105 may perform the search processing based on a difference between the first ranking and the second ranking. This difference is the difference between the rank for the first ranking and the rank for the second ranking. In the example of FIG. 3, for the second classification indicating the combination of the second attribute "Brand" and the second attribute value "White wind," the first ranking is ranked 32nd and the second ranking is ranked first, and hence the difference between the rankings is 31. In the same manner for the other second classifications, the search module 105 acquires the difference between the first ranking and the second ranking for each second classification.

For example, the search module 105 executes the search processing based on the second classifications having a rank which is a predetermined number or more places higher than the rank of the first ranking in the second ranking. In the example of FIG. 3, the second classification indicating the combination of the second attribute "Brand" and the second attribute value "White wind" is ranked 31 places higher, and hence the search model 105 executes the search processing based on this second classification. The method of selecting the second classification to be used in the search processing is different from that in the first embodiment, but the method of executing the search processing itself is the same as that in the first embodiment.

The ranking determination system 1 of Modification Example 1-3 executes the search processing based on the difference between the first ranking and the second ranking. As a result, for example, by using a second classification having a large difference between the estimation result of the first model M1 and the estimation result of the second model M2 in the search processing, compared to when only the first ranking is used, the search processing can be executed after the intention of the user, which cannot be estimated by the first model M1, is estimated, and hence the accuracy of the search processing is increased.

Modification Example 1-4

For example, as described in the first embodiment, when the combinations of the second attribute and the second attribute value corresponds to the second classifications, the first ranking determination module 102 may determine, for each second attribute of a second classification, a first ranking of the attribute value of the second classification. In the example of FIG. 3 and FIG. 4, there is described a case in which the first ranking among all of the second attributes is determined, but the first ranking may be determined for each second attribute.

For example, when it is assumed that there are 100 second attribute values (character strings indicating specific brand names) associated with the second attribute "Brand," in this case, the first ranking determination module 102 determines the first ranking among the 100 second attribute values. In the same manner for the other second attributes, the first ranking determination module 102 determines the first ranking among "n" ("n" is an integer of 2 or more) possible second attribute values of the second attribute.

The second ranking determination module 104 determines, for each second attribute of a second classification, the second ranking of the attribute value of the second classification. The second ranking determination module 104 determines the second ranking for each second attribute. For the second attribute "Brand" in the above-mentioned example, the second ranking determination module 104 determines the second ranking among 100 second attribute values. In the same manner for the other second attributes, the second ranking determination module 104 determines the second ranking among "n" possible second attribute values of the second attribute.

The search module 105 executes the search processing based on the first ranking and second ranking of the second attribute value for each second attribute. For example, for each second attribute, the search module 105 selects a second attribute value having a first ranking and second ranking which is ranked relatively high. The search module 105 executes the search processing based on the second attribute value selected for each second attribute. The method of selecting the second classification to be used in the search processing is different, but the search processing itself is as described in the first embodiment.

The ranking determination system 1 of Modification Examples 1-4 executes the search processing based on the first ranking and the second ranking of the second attribute value for each second attribute. As a result, it is possible to prevent the search processing from using only a certain specific second attribute, and hence the accuracy of the search processing is increased. In the example of FIG. 3 and FIG. 4, the second classification indicating the combination of the second attribute "Brand" and the second attribute value "Engineer" is an erroneous second classification. Even when the first score or the second score of the second classification is high, when the first score or the second score is lower than the first score or the second score of the second classification indicating the combination of the second attribute "Brand" and the second attribute value "Engineer," the second classification is not used in the search processing, and it is thus less likely that an erroneous second classification is used in the search processing.

Modification Example 1-5

For example, even in the case of a second attribute value which has a relatively high score for at least one of the first score or the second score, the search module 105 does not execute the search processing based on the second attribute and the second attribute value when the first ranking and the second ranking are ranked relatively low among the second attributes of the second attribute value. Further, even for a second attribute value which has a relatively low score for at least one of the first score or the second score, the search module 105 may execute the search processing based on the second attribute and the second attribute value when the first ranking and the second ranking are ranked relatively high among the second attributes of the second attribute value.

In the example of FIG. 3 and FIG. 4, even when at least one of the first score or the second score of the second attribute "Brand" and the second attribute value "Engineer" is relatively higher than at least one of the first score or the second score of another second attribute and second attribute value (for example, second attribute "Color" and second attribute value "Black," which are not shown in FIG. 3 and FIG. 4), when the at least one of the first score or the second score of the second attribute "Brand" and the second attribute value "Engineer" is lower than at least one of the first score or the second score of the same second attribute "Brand" and the second attribute value "White wind," the second attribute "Brand" and the second attribute value "Engineer" are not used in the search processing.

For example, even when at least one of the first score or the second score of the second attribute "Brand" and the second attribute value "White wind" is relatively lower than at least one of the first score or the second score of another second attribute and second attribute value (for example, second attribute "Color" and second attribute value "White"), when the at least one of the first score or the second score is relatively high among the second attribute "Brand," the second attribute "Brand" and the second attribute value "White wind" are used in the search processing.

The ranking determination system 1 of Modification Example 1-5 can prevent only a certain specific second attribute from being used in the search processing, and hence the accuracy of the search processing is increased. For example, even when the second attribute value to be used in the search processing has a low first score or second score overall, the second attribute value can be used in the search processing as long as the second attribute value is ranked high among the second attributes to which the second attribute value belongs. As a result, the accuracy of the search processing is increased.

3-2. Modification Examples Relating to Second Embodiment

Modification examples relating to the second embodiment are now described. In the modification examples relating to the second embodiment, like in the second embodiment, the first ranking and the second ranking are determined in order to generate the training data for the first model M1.

Modification Example 2-1

For example, the training data generation module 307 may generate the training data such that a second classification having a higher rank for the second ranking than for the first ranking is learned by the first model M1. The training data generation module 307 compares, for each second classification, the rank for the first ranking with the rank for the second ranking. The training data generation module 307 selects a second classification having a higher rank for the second ranking, and generates pairs of past queries and the selected second classification as the training data.

In the ranking determination system 1 of Modification Example 2-1, the training data generation module 307 generates the training data such that a second classification having a higher rank for the second ranking than for the first ranking is learned by the first model M1. As a result, the first model M1 can learn past queries and second classifications which have not been sufficiently learned by the first model M1 but have been learned by the second model M2 to some extent, and thus the accuracy of the first learning model M1 is increased.

Modification Example 2-2

For example, opposite to Modification Example 2-1, the training data generation module 307 may generate the training data such that a second classification having a lower rank for the second ranking than for the first ranking is not learned by the first model M1. The training data generation module 307 compares, for each second classification, the rank for the first ranking with the rank for the second ranking. The training data generation module 307 generates the training data without selecting the second classifications having a lower rank for the second ranking.

The ranking determination system 1 of Modification Example 2-2 generates the training data such that a second classification having a lower rank for the second ranking than for the first ranking is not learned by the first model M1. As a result, it is possible to prevent the first model M1 from further learning past queries and second classifications which have been learned by the first model M1 to some extent, and thus overtraining of the first model M1 is prevented and the accuracy of the first learning model M1 is increased.

3-3. Modification Example Common to First Embodiment and Second Embodiment

Figure 15:
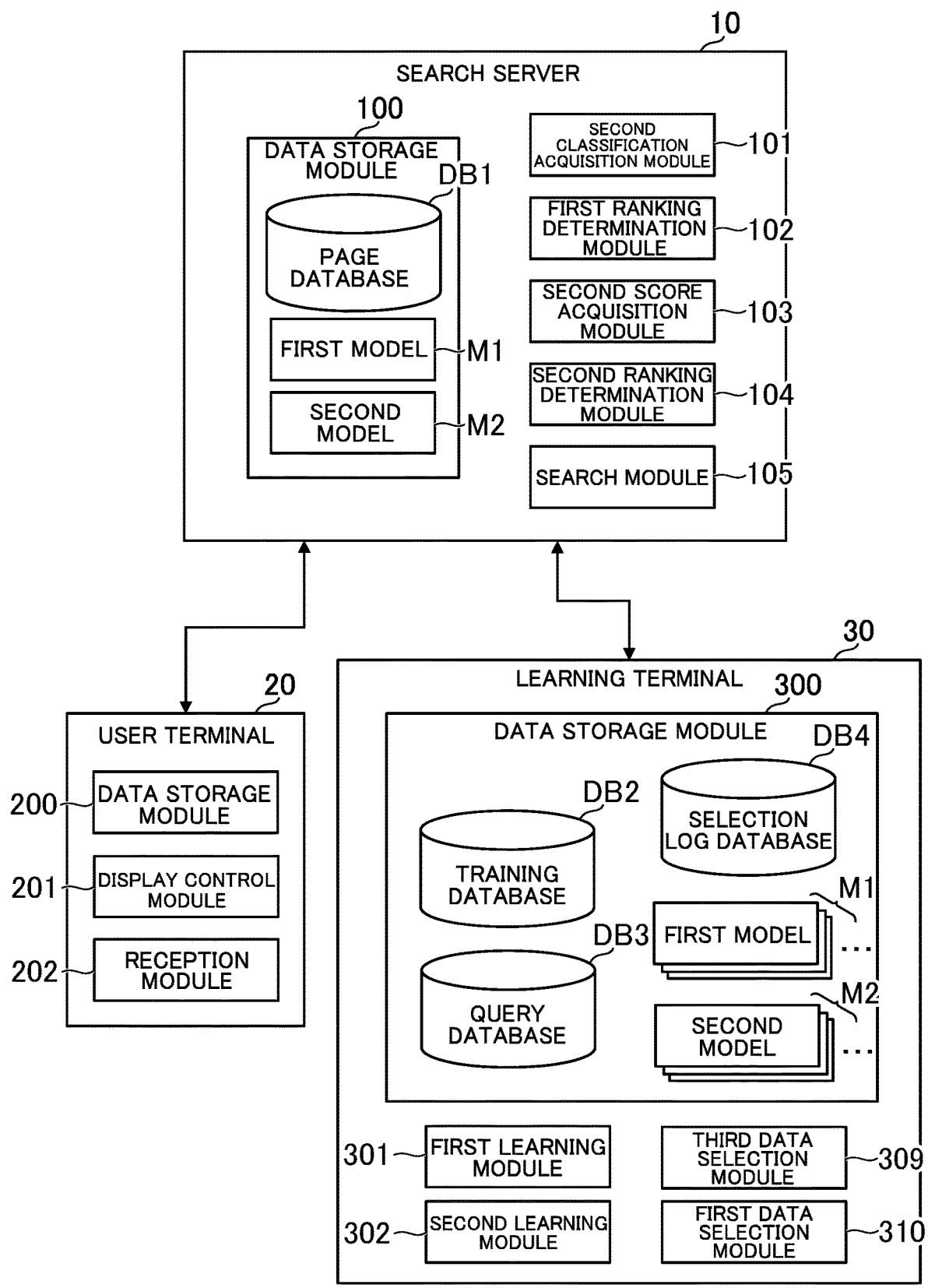
FIG. 15 is a diagram for illustrating an example of functional blocks in modification examples common to the first embodiment and the second embodiment.
Figure 16:
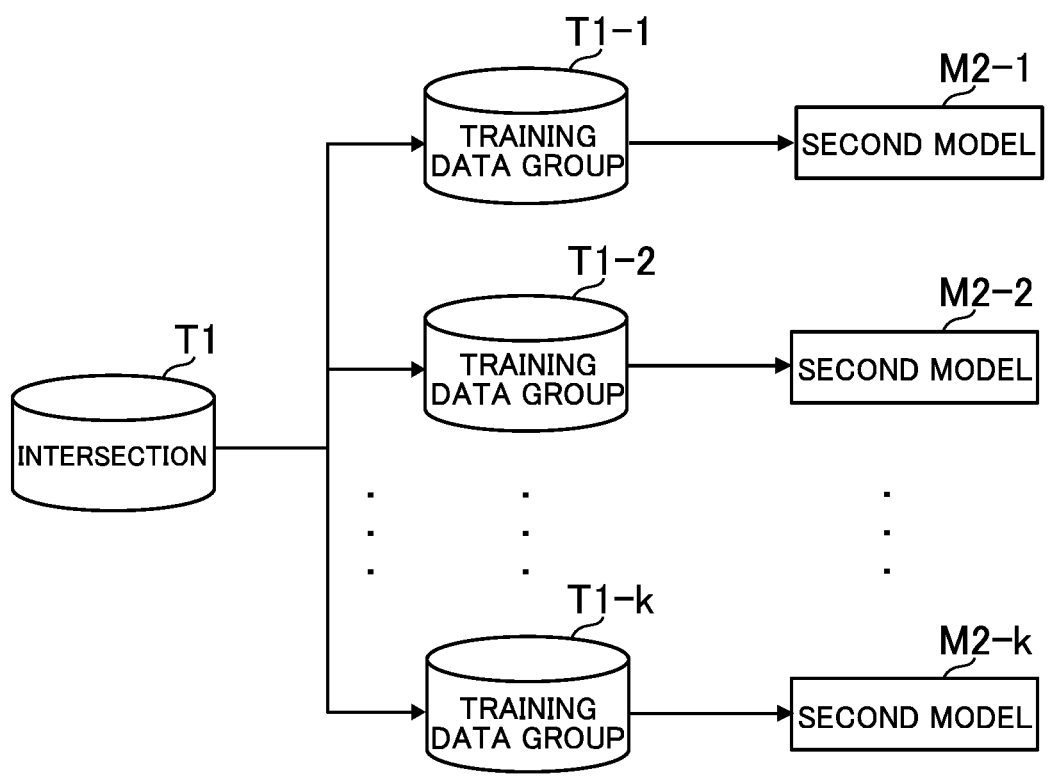
FIG. 16 is a diagram for illustrating an example of a processing flow in the modification examples common to the first embodiment and the second embodiment.

Modification examples common to the first embodiment and the second embodiment are now described. FIG. 15 is a diagram for illustrating an example of functional blocks in modification examples common to the first embodiment and the second embodiment. A third data selection module 309 and a first data selection module 310 are implemented by the controller 31. FIG. 16 is a diagram for illustrating an example of a processing flow in the modification examples common to the first embodiment and the second embodiment. The search service in the first embodiment is now given below as an example, but the processing described below can also be applied to the search service in the second embodiment.

Modification Example 3-1

For example, a plurality of second models M2 may be created by using random sampling. The ranking determination system 1 of Modification Example 3-1 includes the third data selection module 309. The third data selection module 309 randomly and repeatedly selects a part of a third database which stores a plurality of pieces of third data. The third database is a database which stores candidates for the third data. In Modification Example 3-1, there is described a case in which the training data group T1 of the intersection described with reference to FIG. 10 corresponds to the third database.

In the example of FIG. 16, "k" ("k" is an integer equal to or more than 2) second models M2 are created. The number of second models M2 in the case of "k" being 5 is not limited to five, as long as the number is two or more. For example, there may be two, three, four, or six or more second models M2. For example, the third data selection module 309 randomly selects, from the training data group T1 of the intersection described with reference to FIG. 10, a predetermined number of first training data groups T1-1 to be learned by a first second model M2-1.

For example, the third data selection module 309 randomly selects a predetermined number of second training data groups T5-2 to be learned by a second second model M2-2 from a training data group T5 of the intersection. The second training data group T5-2 is not exactly the same as the first training data group T5-1. The second training data group T5-2 partially matches the first training data group T5-1. In the same way, the third data selection module 309 selects third and subsequent training data groups T1-$m$ to be learned by third and subsequent second models M2-*m* ("m" is an integer of 3 or more and "k" or less).

The second learning module 302 executes the learning processing relating to the plurality of second models M2 based on a part of repeatedly and randomly selected third data. In the example of FIG. 16, the second learning module 302 executes the learning processing of the first second model M2-1 based on the first training data group T1-1. The second learning module 302 executes the learning processing of the second second model M2-2 based on the second training data group T1-2. In the same way, the second learning module 302 executes the learning processing of the third and subsequent second models M2-*m* based on the third and subsequent training data groups T1-*m*. The individual learning processing is as described in the first embodiment.

The second score acquisition module 103 acquires the second score for each second model M2. In Modification Example 3-1, combinations of queries and second classifications are input to each of the plurality of second models M2. Assuming that "k" is 5, the second score acquisition module 103 acquires five of the second scores for a certain query and second classification. The second ranking determination module 104 determines the second ranking based on the second score acquired for each second model M2. For example, the second ranking determination module 104 calculates an average second score for each second classification. The second ranking determination module 104 determines the second rankings in descending order of average value. The average value may be a simple average or a weighted average.

The second ranking determination module 104 may determine the second ranking for each second model M2 in place of calculating an average of the second scores. Assuming that "k" is 5, then five second rankings are determined. The second ranking determination module 104 may determine the average rank of the five second rankings as a final second ranking. The search processing after the second ranking is determined is as described in the first embodiment.

The ranking determination system 1 of Modification Example 3-1 uses random sampling to execute the learning processing of the second model M2. The ranking determination system 1 determines the second ranking based on the second score acquired for each second model M2. As a result, a plurality of second models M2 can be used, and thus the accuracy of the second ranking is higher than when only one second model M2 is used.

Modification Example 3-2

For example, when random sampling like that of Modification Example 3-1 is executed, the third data selection module 309 may randomly and repeatedly select a part of the training data group T1 of the intersection such that the third data associated with the same third classification as a second classification which increases the second ranking is preferentially selected. In Modification Example 3-1, it is assumed that the second classification which increases the second ranking is specified by the administrator of the search service. The third data selection module 309 randomly selects, for a predetermined number or more of the "k" second models M2 (for example, about 70% of "k") of the second models M2, a part of the training data group T1 such that the third data associated with the same third classification as the second classification which increases the second ranking is selected.

For example, when it is assumed that the second classification indicating the combination of the second attribute "Brand" and the second attribute value "White wind" is a second classification which increases the second ranking, in this case, the third data selection module 309 randomly selects a part of the training data group T1 such that this second classification is learned by a predetermined number or more of second models M2 among the "k" second models M2. In place of this second classification being manually specified by the administrator of the search service, a second classification which has not been learned much by the current first model M1 may be automatically specified. For example, a second classification which rarely appears in the selection log database DB4 may be automatically specified.

The ranking determination system 1 of Modification Example 3-2 randomly and repeatedly selects a part of the third database such that the third data associated with the same third classification as a second classification which increases the second ranking is preferentially selected. As a result, the learning processing of the second model M2 can be executed so that the second ranking of a predetermined second classification is likely to increase. For example, even when there is a second classification which accurately represents the intention of the user but does not appear much in the selection log database DB4, the second model M2 can preferentially learn such a second classification.

Modification Example 3-3

For example, the first model M1 may be created by using random sampling. The ranking determination system 1 of Modification Example 3-3 includes the first data selection module 310. The first data selection module 310 randomly and repeatedly selects a part of the training database DB2 storing a plurality of pieces of first data. The training database DB2 is an example of the first database. Thus, in the description of Modification Example 3-3, "training database DB2" can be read as "first database." In Modification Example 3-3, like the second models M2 in Modification Example 3-1, a case in which five first models M1 are created is given as an example. The number of first models M1 is not limited to five, as long as the number is two or more. For example, there may be two, three, four, or six or more first models M1.

For example, the first data selection module 310 randomly selects a first training data group to be learned by a first first model M1 from the training database DB2. The first data selection module 310 randomly selects a second training data group to be learned by a second first model M1 from the training database DB2. The second training data group is not exactly the same as the first training data group. The second training data group partially matches the first training data group. In the same way, the first data selection module 310 randomly selects third to fifth training data groups to be learned by third to fifth first models M1.

The first learning module 301 executes the learning processing for the plurality of first models M1 based on the repeatedly and randomly selected part of the first data. The first learning module 301 executes the learning processing of the first first model M1 based on the first training data group. The first learning module 301 executes the learning processing of the second first model M1 based on the second training data group. In the same way, the first learning module 301 executes learning processing of the third to fifth first models M1 based on the third to fifth training data groups. The individual learning processing is as described in the first embodiment.

The second classification acquisition module 101 acquires a plurality of second classifications for each first model M1. In Modification Example 3-3, a query is input to each of the plurality of first models M1. For example, the second classification acquisition module 101 acquires the first score for each first model M1. In the above-mentioned example, there are five first models M1, and hence the second classification acquisition module 101 acquires five first scores for a given one second classification. The first ranking determination module 102 may determine a first ranking based on the first score acquired for each first model M1. In this case, the average value of the first scores may be used in the same way as the determination method for the second ranking described in Modification Example 3-1, or the average rank calculated from the five first rankings may be used.

The ranking determination system 1 of Modification Example 3-3 uses random sampling to execute the learning processing of the first model M1. The ranking determination system 1 determines the first ranking based on the first score acquired for each first model M1. As a result, a plurality of first models M1 can be used, and thus the accuracy of the first ranking is higher than when only one first model M1 is used.

3-4. Other Modification Examples

For example, the modification examples described above may be combined.

For example, the ranking determination system 1 may be applied to a service other than a search service. The other service may be any service, such as an electronic commerce service, an SNS, an encyclopedia service, a travel reservation service, a financial service, a communication service, or a payment service. When the ranking determination system 1 is applied to an electronic commerce service, the search service described in the first embodiment, the second embodiment, and the modification examples described above may be provided within the electronic commerce service. In this case, the page of a product sold by the electronic commerce service corresponds to the web page. Each attribute and each attribute value becomes an attribute and attribute value of the product.

For example, when the ranking determination system 1 is applied to an SNS, the first data, the second data, and the third data are user posts. Each attribute and each attribute value becomes a tag and a tag value for classifying the user posts. For example, when the ranking determination system 1 is applied to an online encyclopedia service, the first data, the second data, and the third data are content indicating the meaning of terms. Each attribute and each attribute value becomes an attribute and an attribute value for classifying the content. Similarly, the ranking determination system 1 can be applied to other services in situations in which some kind of data is classified.

For example, as the machine learning method of the first model M1 and the second model M2, a multi-label model (multi-class classification) has been given as an example, but the model may be a model capable of labeling only one type of label. The first model M1 and the second model M2 may be models which use other learning methods that are not classified as machine learning methods. For example, the first model M1 and the second model M2 may be models which use dictionaries or rules.

For example, the functions described as being implemented by the search server 10 may be implemented by another computer, or may be distributed among a plurality of computers. The functions described as being implemented by the learning terminal 30 may be implemented by another computer, or may be distributed among a plurality of computers. For example, the data described as being stored in the data storage modules 100 and 300 may be stored in a database server.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A ranking determination system, comprising at least one processor configured to:
   acquire a plurality of second classifications relating to second data based on a first model which has learned a relationship between first t data and a first classification relating to the first data;
   acquire, for each of the plurality of second classifications, a second score relating to a validity of a combination of the second data and the each of the plurality of second classifications based on a second model which has learned a validity of a combination of third data and a third classification relating to the third data; and
   determine a second ranking for each of the plurality of second classifications based on the second score of the each of the plurality of second classifications.

2. The ranking determination system according to claim 1, wherein the second data is a query input by a user, and wherein the at least one processor is configured to:
   acquire, when the query is input by the user, the plurality of second classifications relating to the query;
   acquire, when the query is input by the user, the second score for each of the plurality of second classifications;
   determine, when the query is input by the user, the second ranking; and
   execute, when the query is input by the user, search processing based on the query and the second ranking.

3. The ranking determination system according to claim 2, wherein the at least one processor is configured to:
   acquire, for each of the plurality of second classifications, a first score relating to a validity of an estimation result of the first model;
   determine, when the query is input by the user, a first ranking for each of the plurality of second classifications, based on the first score of the each of the plurality of second classifications; and
   execute, when the query is input by the user, the search processing based on the query, the first ranking, and the second ranking.

4. The ranking determination system according to claim 3, wherein the at least one processor is configured to:
   determine a third ranking for each of the plurality of second classifications based on the first ranking, the second ranking, and a third model; and
   execute the search processing based on the query and the determined third ranking.

5. The ranking determination system according to claim 4, wherein the at least one processor is configured to determine the third ranking based on the first score of the each of the plurality of second classifications, the second score of the each of the plurality of second classifications, the first ranking, the second ranking, and the third model.

6. The ranking determination system according to claim 3, wherein the at least one processor is configured to execute the search processing based on a difference between the first ranking and the second ranking.

7. The ranking determination system according to claim 3, wherein each of the plurality of second classifications is a combination of an attribute and an attribute value, and wherein the at least one processor is configured to:
determine, for each attribute of each of the plurality of second classifications, the first ranking of the attribute value of the each of the plurality of second classifications;
determine, for each attribute of each of the plurality of second classifications, the second ranking of the attribute value of the each of the plurality of second classifications; and
execute the search processing based on the first ranking and the second ranking of the attribute value of the each attribute.

8. The ranking determination system according to claim 7, wherein the at least one processor is configured to:
avoid executing, even for an attribute value which has a relatively high score for at least one of the first score or the second score, the search processing based on the attribute and the attribute value when the first ranking and the second ranking are ranked relatively low among the attributes of the attribute value; and
execute, even for an attribute value which has a relatively low score for at least one of the first score or the second score, the search processing based on the attribute and the attribute value when the first ranking and the second ranking are ranked relatively high among the attributes of the attribute value.

9. The ranking determination system according to claim 2, wherein the first data is an index usable in the search processing,
wherein the first classification is a classification relating to the index,
wherein the third data is a past query input in a past search, and
wherein the third classification is a classification relating to a result of selection from results of the past search.

10. The ranking determination system according to claim 1, wherein the at least one processor is configured to generate training data to be learned by the first model based on the second data and the second ranking.

11. The ranking determination system according to claim 10, wherein the at least one processor is configured to:
acquire, for each of the plurality of second classifications, a first score relating to a validity of an estimation result of the first model;
determine a first ranking for each of the plurality of second classifications based on the first score of the each of the plurality of second classifications; and
generate the training data based on the first ranking and the second ranking.

12. The ranking determination system according to claim 11, wherein the at least one processor is configured to generate the training data such that the first model learns the second classifications having a higher second ranking than the first ranking.

13. The ranking determination system according to claim 11, wherein the at least one processor is configured to generate the training data such that the first model avoids learning the second classifications having a lower second ranking than the first ranking.

14. The ranking determination system according to claim 1, wherein the at least one processor is configured to:
randomly and repeatedly select a part of a third database which stores a plurality of pieces of the third data;
execute learning processing relating to a plurality of the second models based on the randomly and repeatedly selected part of the plurality of pieces of the third data;
acquire the second score for each of the plurality of the second models; and
determine the second ranking based on the second score acquired for the each of the plurality of the second models.

15. The ranking determination system according to claim 14, wherein the at least one processor is configured to randomly and repeatedly select the part of the third database such that one of the plurality of pieces of the third data associated with the same third classification as the second classification which increases the second ranking is preferentially selected.

16. The ranking determination system according to claim 1, wherein the at least one processor is configured to:
randomly and repeatedly select a part of a first database which stores a plurality of pieces of the first data;
execute learning processing relating to a plurality of the first models based on the randomly and repeatedly selected part of the plurality of pieces of the first data; and
acquire the plurality of second classifications for each of the plurality of the first models.

17. A ranking determination method, comprising:
acquiring a plurality of second classifications relating to second data based on a first model which has learned a relationship between first data and a first classification relating to the first data;
acquiring, for each of the plurality of second classifications, a second score relating to a validity of a combination of the second data and the each of the plurality of second classifications based on a second model which has learned a validity of a combination of third data and a third classification relating to the third data; and
determining a second ranking for each of the plurality of second classifications based on the second score of the each of the plurality of second classifications.

18. A non-transitory information storage medium having stored thereon a program for causing a computer to:
acquire a plurality of second classifications relating to second data based on a first model which has learned a relationship between first data and a first classification relating to the first data;
acquire, for each of the plurality of second classifications, a second score relating to a validity of a combination of the second data and the each of the plurality of second classifications based on a second model which has learned a validity of a combination of third data and a third classification relating to the third data; and
determine a second ranking for each of the plurality of second classifications based on the second score of the each of the plurality of second classifications.

* * * * *